US009275276B2

(12) United States Patent
Kawaguchi

(10) Patent No.: US 9,275,276 B2
(45) Date of Patent: Mar. 1, 2016

(54) POSTURE ESTIMATION DEVICE AND POSTURE ESTIMATION METHOD

(71) Applicant: Panasonic Corporation, Osaka (JP)

(72) Inventor: Kyoko Kawaguchi, Tokyo (JP)

(73) Assignee: PANASONIC CORPORATION, Osaka (JP)

(*) Notice: Subject to any disclaimer, the term of this patent is extended or adjusted under 35 U.S.C. 154(b) by 103 days.

(21) Appl. No.: 14/364,777

(22) PCT Filed: Nov. 14, 2012

(86) PCT No.: PCT/JP2012/007298
§ 371 (c)(1),
(2) Date: Jun. 12, 2014

(87) PCT Pub. No.: WO2013/088639
PCT Pub. Date: Jun. 20, 2013

(65) Prior Publication Data
US 2014/0301605 A1 Oct. 9, 2014

(30) Foreign Application Priority Data

Dec. 14, 2011 (JP) ................................. 2011-273575

(51) Int. Cl.
G06T 7/00 (2006.01)
G06T 7/20 (2006.01)
G06K 9/00 (2006.01)

(52) U.S. Cl.
CPC .......... G06K 9/00369 (2013.01); G06T 7/0046 (2013.01); G06T 7/2046 (2013.01); G06T 2207/30196 (2013.01)

(58) Field of Classification Search
CPC ................ G06T 7/0046; G06T 7/2046; G06T 2207/30196; G06K 9/00369
See application file for complete search history.

(56) References Cited

U.S. PATENT DOCUMENTS 8,892,421 B2* 11/2014 Sheehan ................ G09B 19/06
704/9
2004/0091153 A1 5/2004 Nakano et al.
(Continued)

FOREIGN PATENT DOCUMENTS

JP 2004-206656 A 7/2004
JP 2005-351814 A 12/2005
JP 2007-310707 A 11/2007

OTHER PUBLICATIONS

Yang et al., "Articulated pose estimation with flexible mixtures-of-parts", Jun. 2011, Computer Vision and Pattern Recognition (CVPR), 2011 IEEE Conference on, 1385-1392.*
(Continued)

Primary Examiner — Katrina Fujita
(74) Attorney, Agent, or Firm — Pearne & Gordon LLP

(57) ABSTRACT

A posture estimation device that is capable of highly precisely estimating the posture of an object comprising multiple parts. Said device (100) comprises: a posture information database (110) that for each of multiple postures, holds posture information that defines the placement of multiple parts; a fitting unit (160) that computes, for each of the parts in an image, a correlation level between the placement of the parts and the posture information; a difficulty level information table (130) that holds an estimation difficulty level that is a degree of difficulty of estimating each part position and computed on the basis of each parallel line components of each of the parts contained in the posture information; and a posture estimation unit (170) that to the correlation level, applies a weighting based on the estimation difficulty level, and on the basis of the weighted correlation level, estimates the posture of the object.

10 Claims, 26 Drawing Sheets

(56) References Cited

U.S. PATENT DOCUMENTS

| | | | |
|---|---|---|---|
| 2007/0268295 A1 | 11/2007 | Okada | |
| 2009/0080780 A1* | 3/2009 | Ikeda | G06T 7/0046 382/209 |
| 2011/0243227 A1* | 10/2011 | Yoneji | H04N 19/197 375/240.12 |
| 2012/0056800 A1* | 3/2012 | Williams | G06F 3/011 345/156 |
| 2012/0150534 A1* | 6/2012 | Sheehan | G06F 17/274 704/9 |
| 2013/0230211 A1* | 9/2013 | Tanabiki | G06T 7/0046 382/103 |
| 2013/0243259 A1* | 9/2013 | Kawaguchi | G06K 9/00369 382/103 |

OTHER PUBLICATIONS

Weik et al., "Hierarchical 3D Pose Estimation for Articulated Human Body Models from a Sequence of Volume Data", 2001, Robot Vision, vol. 1998 of the series Lecture Notes in Computer Science, 27-34.*
Menier et al., "3D Skeleton-Based Body Pose Recovery", 2006, 3D Data Processing, Visualization, and Transmission, Third International Symposium on, 389-396.*
Paul Viola and Michael J. Jones, "Rapid Object Detection using a Boosted Cascade of Simple Features," Computer Vision and Pattern Recognition, 2001.
Robi Polikar, "Ensemble Based Systems in Decision Making," IEEE Circuits and Systems Magazine, vol. 6, No. 3, pp. 21-45, 2006.
International Search Report for Application No. PCT/JP2012/007298 date Jan. 8, 2013.

* cited by examiner

| TWO-DIMENSIONAL POSTURE IDENTIFIER | IMAGE INFORMATION IDENTIFIER | JOINT POSITION INFORMATION IDENTIFIER | PART ANGLE INFORMATION IDENTIFIER | PART AVERAGE THICKNESS INFORMATION IDENTIFIER |
|---|---|---|---|---|
| aa1 | bb1,bb2 | cc1 | dd1 | ee1 |
| aa2 | bb3 | cc2 | dd2 | ee1 |
| aa3 | bb4 | cc3 | dd3 | ee2 |
| ... | ... | ... | ... | ... |

| THREE-DIMENSIONAL POSTURE IDENTIFIER 611 | TWO-DIMENSIONAL POSTURE IDENTIFIER 612 | THREE-DIMENSIONAL JOINT POSITION INFORMATION IDENTIFIER 613 | TRANSITIONABLE THREE-DIMENSIONAL POSTURE IDENTIFIER 614 |
|---|---|---|---|
| ff1 | aa1 | gg1 | ff2,ff3 |
| ff2 | aa2 | gg2 | ff4,ff5 |
| ff3 | aa3,aa4 | gg3 | ff2,ff5 |
| ... | ... | ... | ... |

610

POSTURE ESTIMATION DEVICE AND POSTURE ESTIMATION METHOD

TECHNICAL FIELD

The present invention relates to a posture estimation apparatus and a posture estimation method for estimating a posture of an object that is formed of a plurality of parts.

BACKGROUND ART

Estimation of the posture of a person based on image data from a captured moving image has been an active area of research in recent years. Estimating behavior using time series information of an estimated posture allows a posture estimation apparatus to determine the behavior of the person by computer analysis based on moving images, and can thus perform behavior analysis that does not depend on human effort. Examples of behavior analysis include detection of unexpected behavior on streets, analysis of purchasing behavior in stores, support for the enhancement of work efficiency in factories, and form coaching in sports.

It is desirable that this kind of posture estimation is performed without attaching an apparatus such as a direction sensor to a person. The reason is that if posture estimation is performed by attaching an apparatus to a person, it is difficult for a random person to be taken as an estimation target, and the cost will increase if there are a large number of estimation targets.

Therefore, as posture estimation that takes a random person as a target, as disclosed, for example, in PTL 1, technology has been proposed that estimates the orientation of the body of a person on the basis of a video obtained by photographing the person.

The technology disclosed in PTL 1 (hereunder, referred to as "related art") estimates candidates for a posture that can be assumed next (hereunder, referred to as "next candidate posture") based on the posture that was estimated the previous time (hereunder, referred to as "previous estimation posture"). The related art compares the position of each part of the next candidate posture with an image of the part in a photographed image, and retrieves a candidate posture with the highest correlation.

However, depending on the posture, a certain part of a person is hidden by another part, and a portion or all of the certain part cannot be recognized on an image (hereunder, such a state is referred to as "concealed"). According to the related art, if there is a part that is being concealed (hereunder, referred to as "concealed part") in this manner, in some cases the outlines of different postures may resemble each other, which makes it impossible to perform correct posture estimation in some cases.

Therefore, according to the related art, an area (number of pixels) that each part occupies in an image is determined with respect to the previous estimation posture, and a part whose area is less than or equal to a threshold is extracted as a concealed part. Further, according to the related art, if there is a concealed part in the previous estimation posture, the degree of freedom with respect to the posture of the concealed part is set higher than that of a part that is not concealed, and the degree of freedom with respect to the next candidate postures is expanded to increase the number of candidate postures. Therefore, according to the related art, even in a case where the previous estimation posture was erroneous due to the difficulty of estimating the position of a concealed part (the lowness of the estimation accuracy), posture estimation can be performed that takes into account a fact that the next candidate postures include a correct posture.

CITATION LIST

Patent Literature

PTL 1
Japanese Patent Application Laid-Open No, 2007-310707

Non-Patent Literature

NPL 1
Paul Viola and Michael J. Jones, "Rapid Object Detection using a Boosted Cascade of Simple Features," Computer Vision and Pattern Recognition, 2001.
NPL 2
Robi Polikar, "Ensemble Based Systems in Decision Making," IEEE Circuits and Systems Magazine, vol. 6, no. 3, pp. 21-45, 2006.

SUMMARY OF INVENTION

Technical Problem

However, a problem of the related art is that it is difficult to estimate a posture with high accuracy. The reason is that, according to the related art, it cannot be said that there is always a high correlation between the smallness of the area of a region that is occupied by a part in an image and the difficulty of estimating a position. That is, according to the related art, if the degree of freedom of the next candidate postures is set unnecessarily high and the number of candidates is increased for a part that occupies a small area but whose position is easy to estimate, the possibility of an erroneous estimation will increase.

Further, it is conceivable to also apply the related art to an object other than a person, such as a robot, in which case, however, a similar problem can also arise.

An object of the present invention is to provide a posture estimation apparatus and a posture estimation method that can estimate the posture of an object that is formed of a plurality of parts with high accuracy.

Solution to Problem

A posture estimation apparatus according to an aspect of the present invention is an apparatus for estimating a posture of an object formed of a plurality of parts, the apparatus including: an image input section that acquires an image that is obtained by photographing the object; a posture information database that holds posture information that defines an arrangement of the plurality of parts for each of the postures; a fitting section that, for each of the parts, calculates a degree of correlation between an arrangement of the plurality of parts in the image and the posture information; a difficulty level information table that holds an estimation difficulty level which is a degree of difficulty of estimating respective position of each of the parts for each of the postures and which is calculated based on respective parallel line components of the part that are included in the posture information; and a posture estimation section that assigns a weight based on the estimation difficulty level to the degree of correlation, and that estimates a posture of the object based on the weighted degree of correlation.

A posture estimation method according to an aspect of the present invention is a method for estimating a posture of an object formed of a plurality of parts, the method including: acquiring an image that is obtained by photographing the object; calculating a degree of correlation for each of the parts between an arrangement of the plurality of parts in the image and posture information that defines an arrangement of the plurality of parts for each of the postures; assigning to the degree of correlation a weight based on an estimation difficulty level which is a degree of difficulty of estimating respective position of each of the parts for each of the postures and which is calculated based on respective parallel line components of the part that are included in the posture information; and estimating a posture of the object based on the weighted degree of correlation.

Advantageous Effects of Invention

According to the present invention, the posture of an object that is formed of a plurality of parts can be estimated with high accuracy.

BRIEF DESCRIPTION OF DRAWINGS

FIG. 9 illustrates an example of the contents of a posture information table according to Embodiment 2;

FIG. 20 illustrates an example of the contents of a three-dimensional posture information table according to Embodiment 3;

DESCRIPTION OF EMBODIMENTS

Embodiments of the present invention will be described in detail hereunder with reference to the accompanying drawings.

Embodiment 1

Embodiment 1 of the present invention is an example of a basic form of the present invention.

Figure 1:
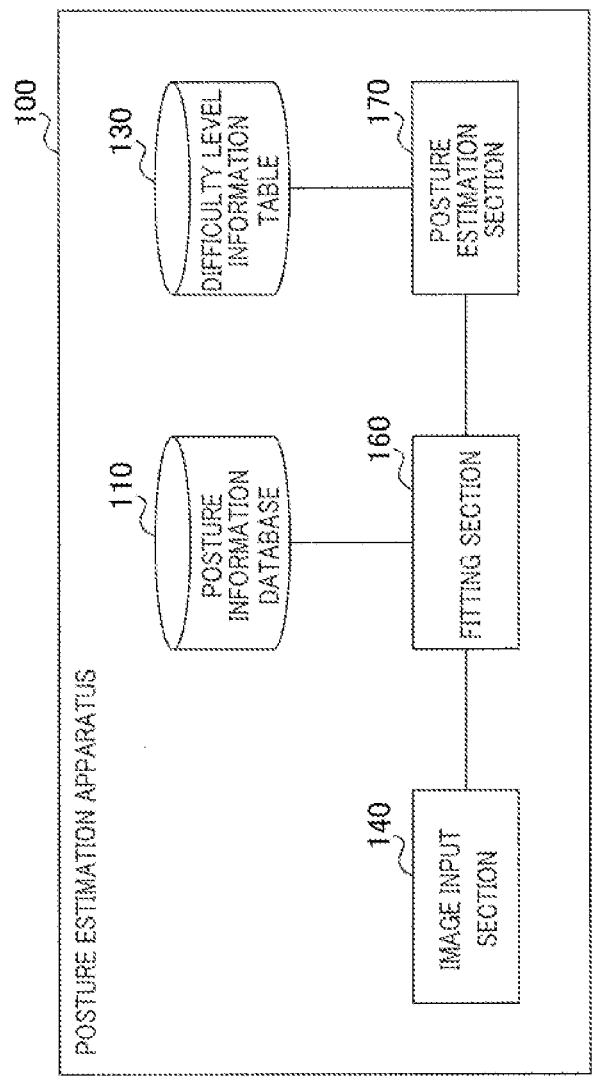
FIG. 1 is a block diagram illustrating an example of a configuration of a posture estimation apparatus according to Embodiment 1 of the present invention.

FIG. 1 is a block diagram illustrating an example of a configuration of a posture estimation apparatus according to Embodiment 1 of the present invention.

Posture estimation apparatus 100 illustrated in FIG. 1 estimates the posture of an object that is formed of a plurality of parts. In FIG. 1, posture estimation apparatus 100 includes image input section 140, posture information database 110, fitting section 160, difficulty level information table 130, and posture estimation section 170.

Image input section 140 acquires an image obtained by photographing an object.

Posture information database 110 holds posture information that defines the arrangement of a plurality of parts for each posture.

Fitting section 160 calculates, for each part, a degree of correlation between the arrangement of a plurality of parts in an image and the posture information.

Difficulty level information table 130 holds information showing an estimation difficulty level that is a degree of estimation difficulty with respect to the respective position of each of the parts for each posture. The difficulty level information is calculated based on a parallel line component of each part included in the posture information.

Posture estimation section 170 assigns a weight that is based on the estimation difficulty level to the degree of correlation for each part, and estimates a posture of an object based on the weighted degree of correlation.

Posture estimation apparatus 100, for example, has a CPU (Central Processing Unit), a storage medium such as a ROM (Read Only Memory) in which a control program is stored, and a working memory such as a RAM (Random Access Memory). In this case, the functions of each of the component parts described above are implemented by the CPU executing the control program.

Posture estimation apparatus 100 configured in this manner can determine the estimation difficulty level of each part on the basis of a parallel line component with respect to the degree of correlation for each part, and perform posture estimation that takes into account the estimation difficulty level of each part.

In comparison to the size of an area that is used in the above described related art, there is a higher correlation between the amount and length of a parallel line component and an estimation difficulty level. Therefore, posture estimation apparatus 100 can estimate the posture of an object that is formed of a plurality of parts with a higher degree of accuracy than in the related art.

The reason why a parallel line component has a high correlation with the estimation difficulty level will now be described.

In the case of a part whose part-likeness is expressed with parallel lines, although the estimation accuracy increases with an increase in the possibility that parallel lines can be extracted, the area that can be extracted and the amount of parallel lines that can be extracted are not proportional. For example, let us consider a case in which 50% of the entire area of a part is covered. If such a part is covered perpendicularly to parallel lines of the part, the possibility that parallel lines can be extracted will be 50%, which is the same as the area thereof that is covered. However, if the part is covered diagonally, the proportion thereof at which parallel lines can be extracted will be zero. That is, with respect to the part-likeness, the estimation accuracy deteriorates according to the proportion of the part that is represented by extracted parallel lines. Accordingly, a parallel line component has a high correlation with the estimation difficulty level.

Embodiment 2

Embodiment 2 of the present invention is an example in which the present invention is applied to an apparatus that estimates a posture of a person by performing fitting (matching) with respect to a likelihood map that indicates a distribution of likelihood regarding the positioning of respective parts.

Note that, in the following description it is assumed that the term "posture of a person" refers to one shape among all the shapes that a human body can take.

<Configuration of Posture Estimation Apparatus>

First, the configuration of a posture estimation apparatus according to the present embodiment will be described.

Figure 2:
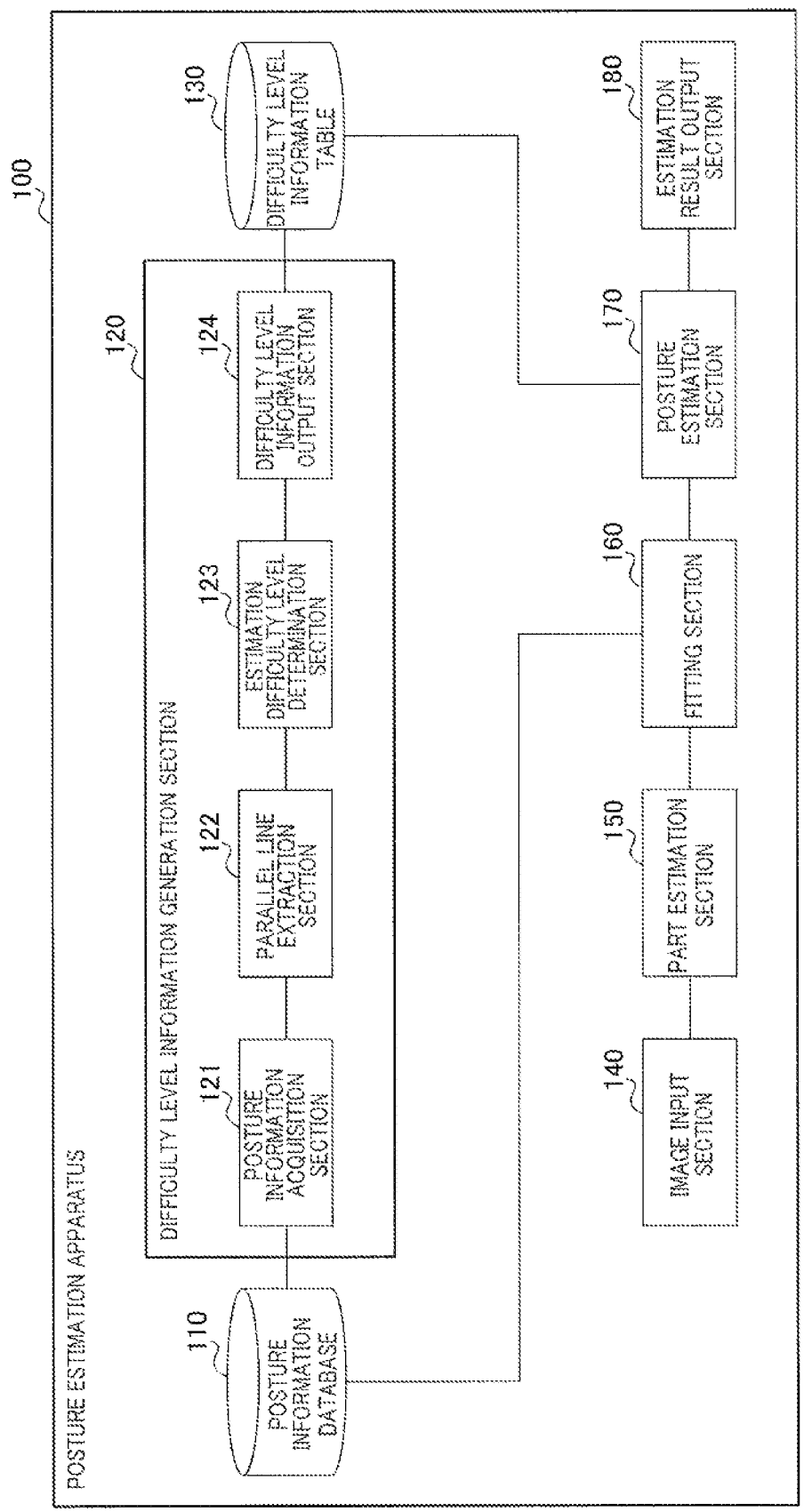
FIG. 2 is a block diagram illustrating an example of a configuration of a posture estimation apparatus according to Embodiment 2 of the present invention.

FIG. 2 is a block diagram that illustrates an example of the configuration of the posture estimation apparatus according to the present embodiment.

In FIG. 2, posture estimation apparatus 100 includes posture information database 110, difficulty level information generation section 120, difficulty level information table 130, image input section 140, part estimation section 150, fitting section 160, posture estimation section 170, and estimation result output section 180.

Posture information database 110 holds posture information that defines the arrangement of a plurality of parts for each posture. A part reference map is included in the posture information. The term "part reference map" refers to a likelihood map that, when a three-dimensional posture of an object is projected onto a two-dimensional plane, shows the distribution of likelihood of being positioned on the two-dimensional plane for each part. The two-dimensional plane corresponds to an imaging surface of a camera (not illustrated in the accompanying drawings) that photographs a person.

In addition, for each posture, as information showing a three-dimensional posture of a person in the relevant posture on a two-dimensional plane, posture information database 110 holds joint position information, part angle information, and part average thickness information, as well as information for specifying the aforementioned items of information.

The joint position information is information that shows positions of each joint on the two-dimensional plane with respect to an image (hereunder, referred to as "skeleton image") obtained when a three-dimensional skeletal posture is projected onto the above described two-dimensional plane.

The part angle information is information that shows an angle of each part (hereunder, referred to as "part angle") on the two-dimensional plane of the skeleton image.

The part angle information shows angles formed between the horizontal direction on a two-dimensional plane and each part.

The part average thickness information is information that shows an average value of the thickness of each part on the two-dimensional plane with respect to an image (hereunder, referred to as "edge image") of an outline when a three-dimensional posture of an object is projected onto a two-dimensional plane.

Note that, the term "part" refers to, among all parts of the human body, a unit whose three-dimensional shape can be regarded as not changing regardless of the manner in which posture of the human body changes, and examples thereof include the right upper arm and the right forearm. Further, the term "joint" refers to a portion that connects parts, and examples thereof include the right elbow.

In addition, the term "skeletal posture" refers to an object that expresses the posture of a person through a set of straight lines that are connected in accordance with the actual connection relationship between the respective joints of the human body. Further, the term "object posture" refers to an object that expresses the posture of a person that includes flesh, skin, hair, and clothes and the like, and also includes external appearance information.

Figure 3:
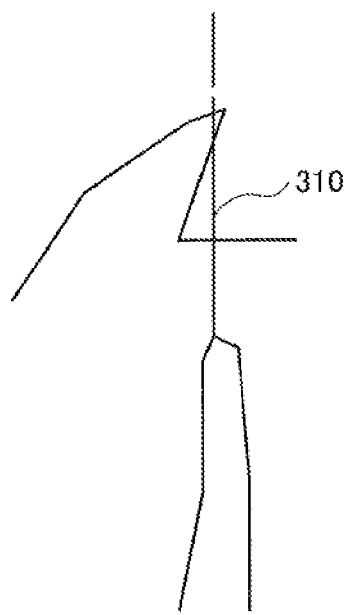
FIG. 3 illustrates an example of a skeleton image according to Embodiment 2.

FIG. 3 illustrates an example of a skeleton image.

As shown in FIG. 3, skeleton image 310 is formed of a plurality of straight lines. Each straight line represents an axis of a part, respectively. The two ends of each straight line indicate the position of a joint with a neighboring part, or the position of an end of the human body.

Figure 4:
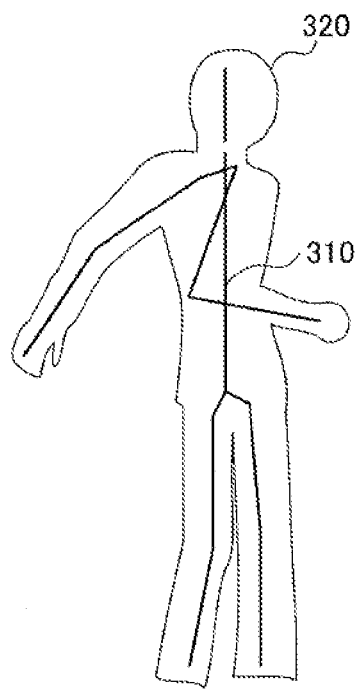
FIG. 4 illustrates an example of a superimposed image in which an edge image is superimposed on a skeleton image according to Embodiment 2.

FIG. 4 illustrates an example of a state (superimposed image) in which an edge image of the same posture is superimposed on skeleton image 310 shown in FIG. 3.

As shown in FIG. 4, edge image 320 shows the outline of a human body that includes clothes or the like that is a shape that covers skeleton image 310 of the same posture.

It is assumed that posture information database 110 also holds skeleton image 310 and edge image 320 for each posture.

The respective portions of skeleton image 310 and edge image 320 are associated with each part (and each joint) of a human-body model.

Figure 5:
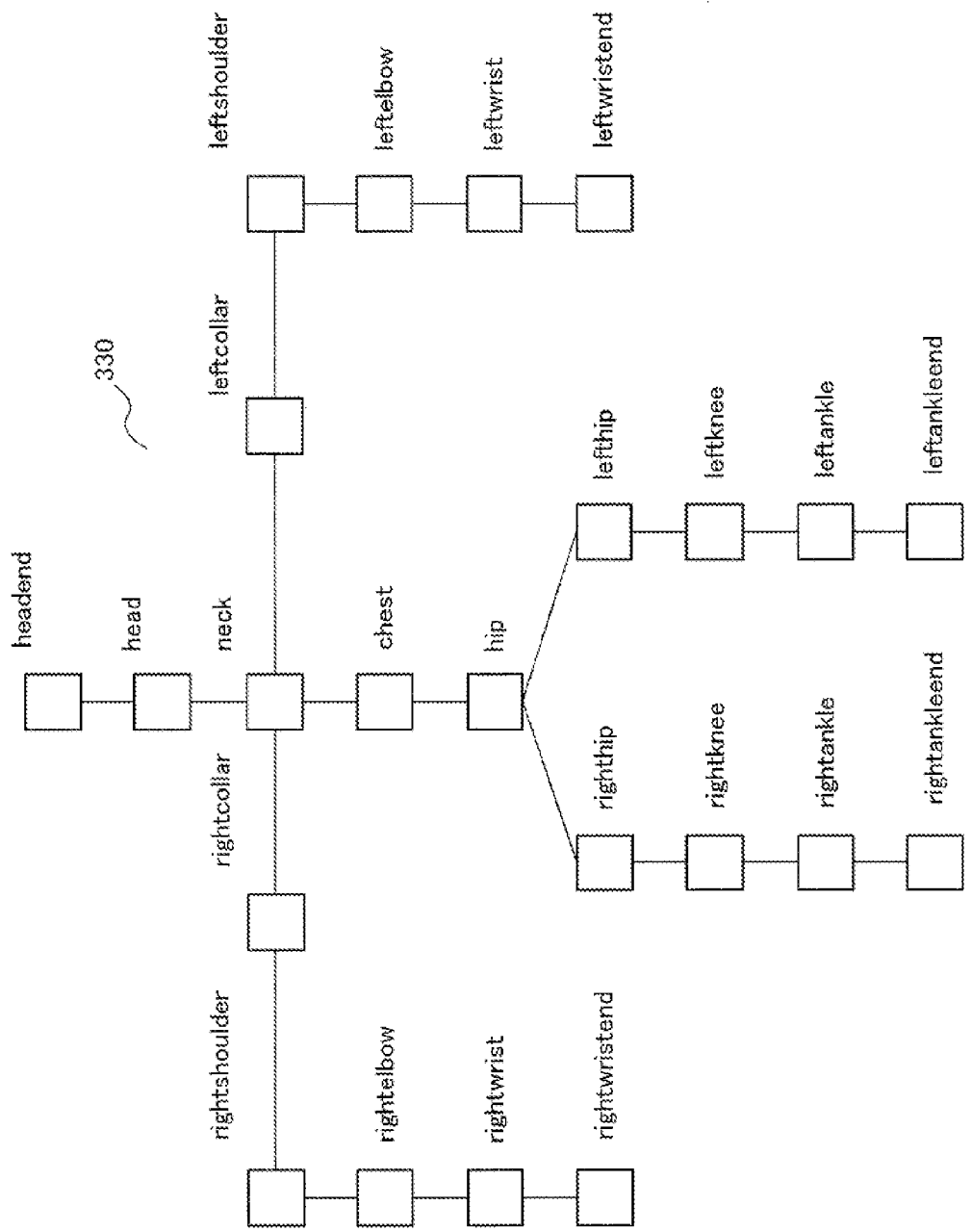
FIG. 5 illustrates an example of a human-body model according to Embodiment 2.

FIG. 5 illustrates an example of a human-body model.

As shown in FIG. 5, human-body model 330, for example, includes 23 joints. An identifier is assigned to each joint. Further, in the present embodiment, it is assumed that the identifiers are part identifiers that indicate a part that connects on a side that is closest to the torso of the corresponding joint (a part that is between the relevant joint and one joint on the inner side of the human body). The aforementioned joint position information, part angle information, and part average thickness information are described using these part identifiers.

Figure 6:
FIG. 6 illustrates an example of joint position information according to Embodiment 2.

FIG. 6 illustrates an example of the joint position information.

As shown in FIG. 6, x-coordinates 412 and y-coordinates 413 are described in association with part identifiers 411 in joint position information 410. Each X-coordinate 412 is an x-coordinate of a position of a joint that is indicated by part identifier 411 in an xy coordinate system that is set on the aforementioned two-dimensional plane (hereunder, referred to simply as "xy coordinate system"). Each y-coordinate 413 is a y-coordinate of a position of a joint that is indicated by part identifier 411 in the xy coordinate system.

Figure 7:
FIG. 7 illustrates an example of part angle information according to Embodiment 2.

FIG. 7 illustrates an example of the part angle information.

As shown in FIG. 7, in part angle information 420, angles 422 are described in association with part identifiers 421. Each angle 422 is a direction of an axis of a part that is indicated by part identifier 421. More specifically, each angle 422 is an angle with respect to the x-axis direction (horizontal direction) of the xy coordinate system that is oriented towards a connection destination from a connection origin of a part among the axial directions of the part.

Figure 8:
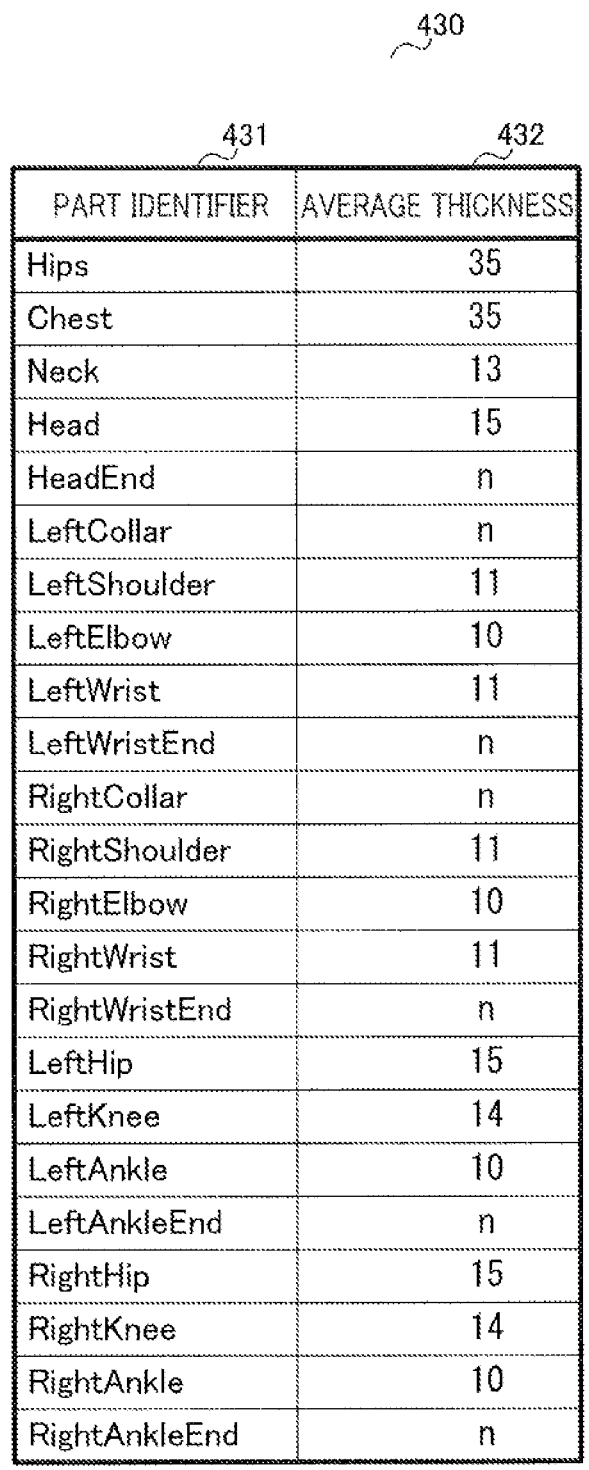
FIG. 8 illustrates an example of part average thickness information according to Embodiment 2.

FIG. 8 illustrates an example of the part average thickness information.

As shown in FIG. 8, average thicknesses 432 are described in association with part identifiers 431 in part average thickness information 430. Average thickness 432 is an average value of a thickness of a part that is indicated by part identifier 431. Note that, in FIG. 8, the character "n" described as average thickness 432 indicates that information with respect to the average value of the thickness of the corresponding part does not exist or is not used.

Joint position information 410, part angle information 420, and part average thickness information 430 that are illustrated in FIG. 6 to FIG. 8, as well as the above described skeleton image and edge image, can differ for each posture.

In this case, it is assumed that a plurality of items of joint position information 410, a plurality of items of part angle information 420, and a plurality of items of part average thickness information 430 are stored in correspondence with a plurality of postures in posture information database 110.

It is also assumed that a plurality of items of image information are stored in correspondence with a plurality of postures in posture information database 110. The image information is used for image fitting that is described later. For example, the image information is data of a silhouette image, data of an edge image, data of a color image, data of the above described skeleton image or data of a background image. The term "silhouette image" refers to an image that shows a region (silhouette) that an image of a person occupies. The term "edge image" refers to an image that shows an outline (edge) of a region that an image of a person occupies. The term "color image" refers to an image that shows colors of respective portions. The term "background image" refers to an image that shows the state of the background behind a person.

A joint position information identifier, a part angle information identifier, and a part average thickness information identifier are assigned to joint position information 410, part angle information 420, and part average thickness information 430, respectively. An image identifier is also assigned to each item of image information.

Posture information database 110 holds estimation difficulty levels. The estimation difficulty levels are degrees of difficulty of estimating the respective position of each of the parts for each posture, and are calculated on the basis of the respective parallel line components of the part that are included in the posture information. More specifically, posture information database 110 associates a posture with posture information and image information by using a posture information table in which the aforementioned identifiers are associated with each posture.

FIG. 9 illustrates an example of the contents of the posture information table.

As shown in FIG. 9, in posture information table 440, for example, image information identifiers 442, joint position information identifiers 443, part angle information identifiers 444, and part average thickness information identifiers 445 are described in association with two-dimensional posture identifiers 441.

Note that, in posture information table 440, information may be described in direct association with each posture without using the above described identifiers.

Difficulty level information generation section 120 that is shown in FIG. 2 extracts parallel line components of each part from the posture information (see FIG. 6 to FIG. 9) that is stored in posture information database 110, and determines the estimation difficulty level of each part based on the extracted parallel line components. Difficulty level information generation section 120 includes posture information acquisition section 121, parallel line extraction section 122, estimation difficulty level determination section 123, and difficulty level information output section 124.

In this case, the term "parallel line component" refers to one set of a plurality of line segments that are parallel to each other among line segments that frame each part. In the present embodiment, it is assumed that the term "parallel line component" refers to a portion of the outline (edge) of the part that is substantially parallel to the axis of the part. Further, as described above, the term "estimation difficulty level" refers to a degree that indicates the difficulty of estimating a position in an image of each of the parts.

Posture information acquisition section 121 acquires posture information of each posture from posture information database 110. Posture information acquisition section 121 outputs the acquired posture information to parallel line extraction section 122.

For each posture, parallel line extraction section 122 extracts parallel line components for the respective parts from the inputted posture information. Parallel line extraction section 122 outputs the extracted parallel line components to estimation difficulty level determination section 123.

Estimation difficulty level determination section 123 determines an estimation difficulty level for each posture based on the extracted parallel line components, and holds the determined results in the difficulty level information table. More specifically, estimation difficulty level determination section 123 determines an estimation difficulty level of each part for each posture based on the parallel line components that are input thereto. Further, estimation difficulty level determination section 123 outputs the determined estimation difficulty levels to difficulty level information output section 124.

Difficulty level information output section 124 outputs the inputted estimation difficulty levels as difficulty level information in which a two-dimensional posture identifier of a corresponding posture and a part identifier of a corresponding part are associated, and stores the difficulty level information in difficulty level information table 130.

Image input section 140 acquires an image obtained by photographing an object. More specifically, image input section 140 acquires, by wire communication or wireless communication, image data of an image that is photographed with a monocular camera installed in a predetermined three-dimensional coordinate space (not illustrated in the accompanying drawings). Image input section 140 may also acquire, by wire communication or wireless communication, image data that is previously stored in a memory device (not illustrated in the accompanying drawings). Image input section 140 outputs the acquired image data to part estimation section 150. A memory device that stores the image data may be physically integrated with posture estimation apparatus 100.

In the following description it is assumed that image data includes images of only one person, however the present invention is not limited thereto, and the image data may include images of more than one person, or may not include an image of a person.

Based on the image data that is inputted thereto, part estimation section 150 estimates a position on the image of each part of the person included in the image and generates a part estimation map. The part estimation map is a likelihood map showing a distribution of likelihood with respect to the position of each part on the image, and corresponds to the above described part reference map. Part estimation section 150 outputs the generated part estimation map to fitting section 160.

Fitting section 160 calculates a degree of correlation between the arrangement of a plurality of parts in the image acquired by image input section 140 and the posture information stored in posture information database 110, for each of the parts. More specifically, fitting section 160 acquires the part reference map from posture information database 110. Fitting section 160 compares the acquired part reference map and the part estimation map that was input thereto, and calculates a degree of correlation between the part reference map and the part estimation map for each posture and for each part. Fitting section 160 outputs the calculated degrees of correlation to posture estimation section 170.

Posture estimation section 170 assigns weights that are based on the estimation difficulty levels that difficulty level information table 130 holds to the respective degrees of correlation received from fitting section 160, and estimates the posture of the object based on the weighted degrees of correlation. More specifically, posture estimation section 170 assigns a weight that is in accordance with the estimation difficulty level to the inputted degree of correlation for each posture and each part, and estimates the posture of the object. Posture estimation section 170 then outputs a two-dimensional posture identifier of the posture that it is estimated the person included in the image assumes to estimation result output section 180.

Estimation result output section 180 outputs the posture indicated by the inputted two-dimensional posture identifier as the estimation result for the posture of the person. Estimation result output section 180, for example, has an image display apparatus, and outputs the estimation result as an image and text or the like.

Posture estimation apparatus 100 includes, for example, a CPU, a storage medium such as a ROM that stores a control program, and a working memory such as a RAM. In this configuration, the functions of each of the component parts described above are implemented by execution of the control program by the CPU.

Posture estimation apparatus 100 configured in this manner can perform posture estimation that takes into account the estimation difficulty level of each part by determining an estimation difficulty level of each part based on a parallel line component with respect to the degree of correlation for each part.

Since a parallel line component of a part indicates the strength of a feature of the part-likeness, the longer that the length of the parallel line component is, the greater the degree to which it is indicated that the feature of the relevant part is easy to extract. That is, the length of a parallel line component has a higher correlation with the estimation difficulty level in comparison to an area size that is used in the above described related art. Therefore, with posture estimation apparatus 100, the use of the parallel line components of parts enables a more accurate determination of the estimation difficulty levels.

Accordingly, compared to the related art, posture estimation apparatus 100 can estimate the posture of an object that is formed of a plurality of parts with higher accuracy than the related art.

This ends the description regarding the configuration of posture estimation apparatus 100.

<Operations of Posture Estimation Apparatus>

Next, operations of posture estimation apparatus 100 are described.

Figure 10:
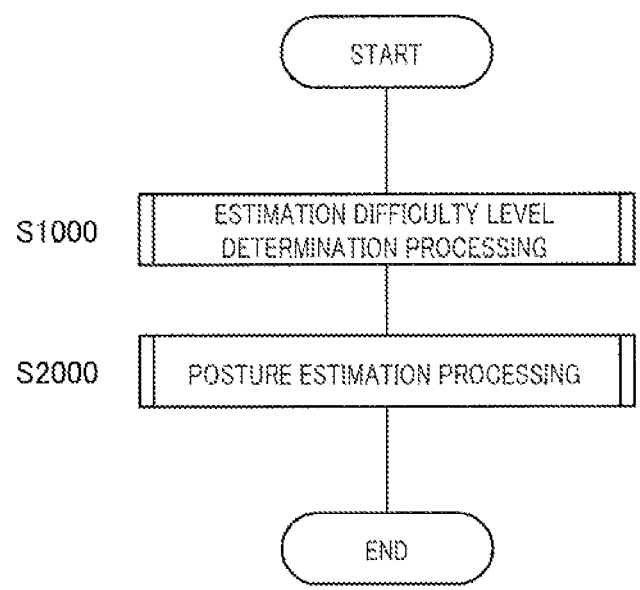
FIG. 10 is a flowchart illustrating an example of operations of the posture estimation apparatus according to Embodiment 2.

FIG. 10 is a flowchart illustrating an example of the operations of posture estimation apparatus 100.

First, in step S1000, posture estimation apparatus 100 performs estimation difficulty level determination processing. The estimation difficulty level determination processing is processing that determines an estimation difficulty level of each part for each posture.

Next, in step S2000, posture estimation apparatus 100 performs posture estimation processing. The posture estimation processing is processing that estimates the posture of a person included in a photographed image using a determined posture difficulty level.

<Detailed Description of Estimation Difficulty Level Determination Processing>

First, the details of the estimation difficulty level determination processing will be described.

Figure 11:
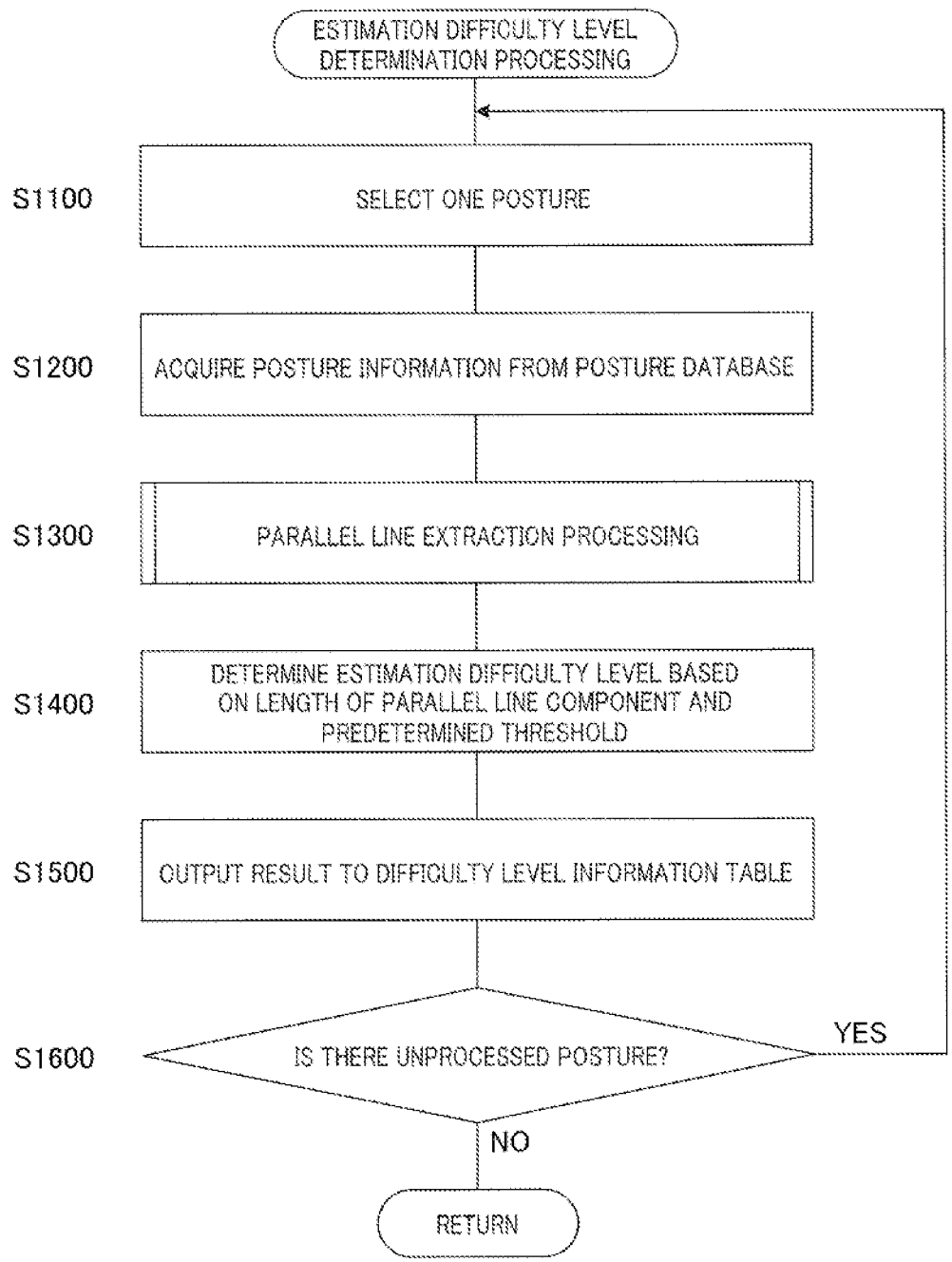
FIG. 11 is a flowchart illustrating an example of estimation difficulty level determination processing according to Embodiment 2.

FIG. 11 is a flowchart illustrating an example of the estimation difficulty level determination processing (S1000 in FIG. 10).

First, in step S1100, posture information acquisition section 121 selects one posture among the postures for which posture information is held in posture information database 110.

Next, in step S1200, posture information acquisition section 121 acquires posture information for the currently selected posture from posture information database 110. In this case, the posture information that posture information acquisition section 121 acquires includes a skeleton image, an edge image, joint position information, and part average thickness information.

Subsequently, in step S1300, parallel line extraction section 122 performs parallel line extraction processing. The parallel line extraction processing is processing that extracts a length (length of a parallel line component) of a portion in which the edges of the currently selected part appear parallel from the posture information.

<Parallel Line Extraction Processing>

Figure 12:
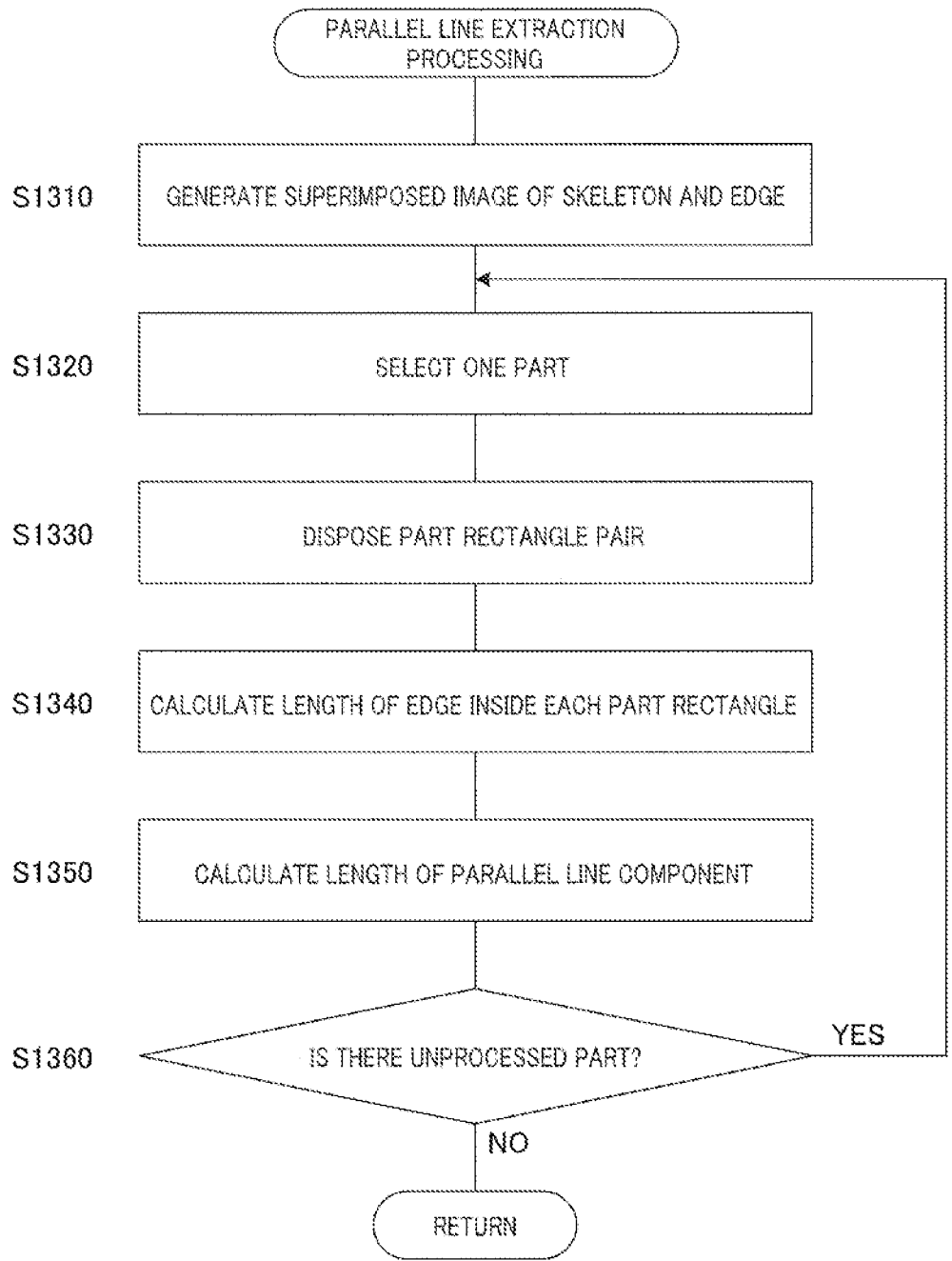
FIG. 12 is a flowchart illustrating an example of parallel line extraction processing according to Embodiment 2.

FIG. 12 is a flowchart that illustrates an example of the parallel line extraction processing (S1300 in FIG. 11).

First, in step S1310, based on a skeleton image and an edge image acquired from posture information database 110, parallel line extraction section 122 generates an image in which a skeleton image and an edge image are superimposed with respect to each other (see FIG. 4; hereunder, referred to as "superimposed image").

Next, in step S1320, parallel line extraction section 122 selects one part from among the parts included in the posture information.

Thereafter, in step S1330, parallel line extraction section 122 disposes a pair of part rectangles on the part that is currently selected in the superimposed image. The part rectangle is a rectangular region at which there is a high possibility that a portion that extends in the length direction of the outline of the part is included, and is a range that serves as a search object of the outline of the part. Parallel line extraction section 122 disposes a pair of part rectangles having a predetermined width on both sides of the axis of the currently selected part based on the position of the axis, the length of the axis, and the average thickness of the selected part.

Figure 13:
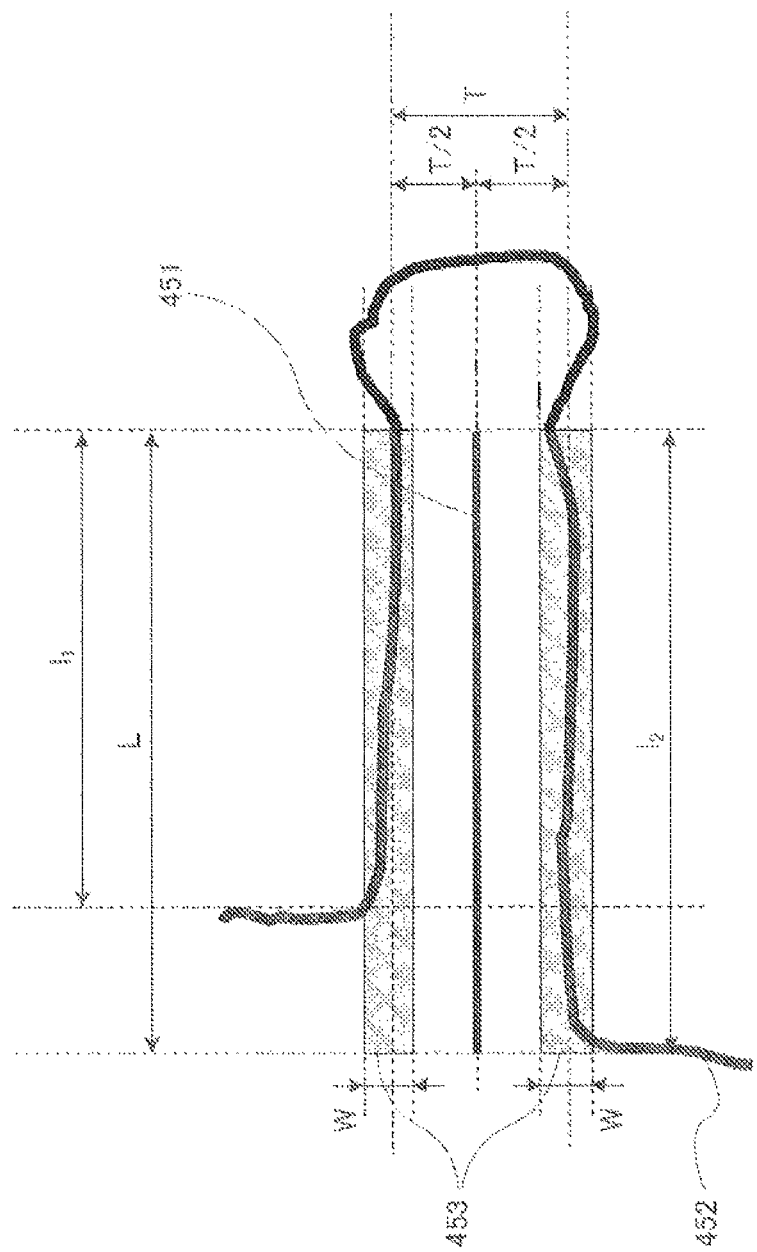
FIG. 13 is a diagram for describing a part rectangle according to Embodiment 2.

FIG. 13 is a diagram for describing a part rectangle.

As shown in FIG. 13, parallel line extraction section 122 disposes a pair of part rectangles 453 on a superimposed image that includes skeleton (axis) 451 and edge (outline) 452 of a currently selected part. The position of each part rectangle 453 is such that the distance from each part rectangle 453 to skeleton 451 is one half (T/2) of an average thickness T of the part. The length of each part rectangle 453 is a length L of skeleton 451 of the part. The width of each part rectangle 453 is a previously determined width W.

It is desirable that the width of each part rectangle 453 is set by taking into consideration errors in the average thickness of the respective parts and unevenness in the thickness within the part. Further, the width of each part rectangle 453 may be a width that differs for each part in proportion to the length L of skeleton 451 or the average thickness T of the parts. In addition, the length of each part rectangle 453 may be a length that is calculated by taking into account an error in the length L of the axis of the part.

Further, in step S1340 in FIG. 12, parallel line extraction section 122 calculates a length in the direction of skeleton 451 of a portion that includes the pair of part rectangles 453 in edge 452 of the part as the length of the edge (see FIG. 13).

Figure 14:
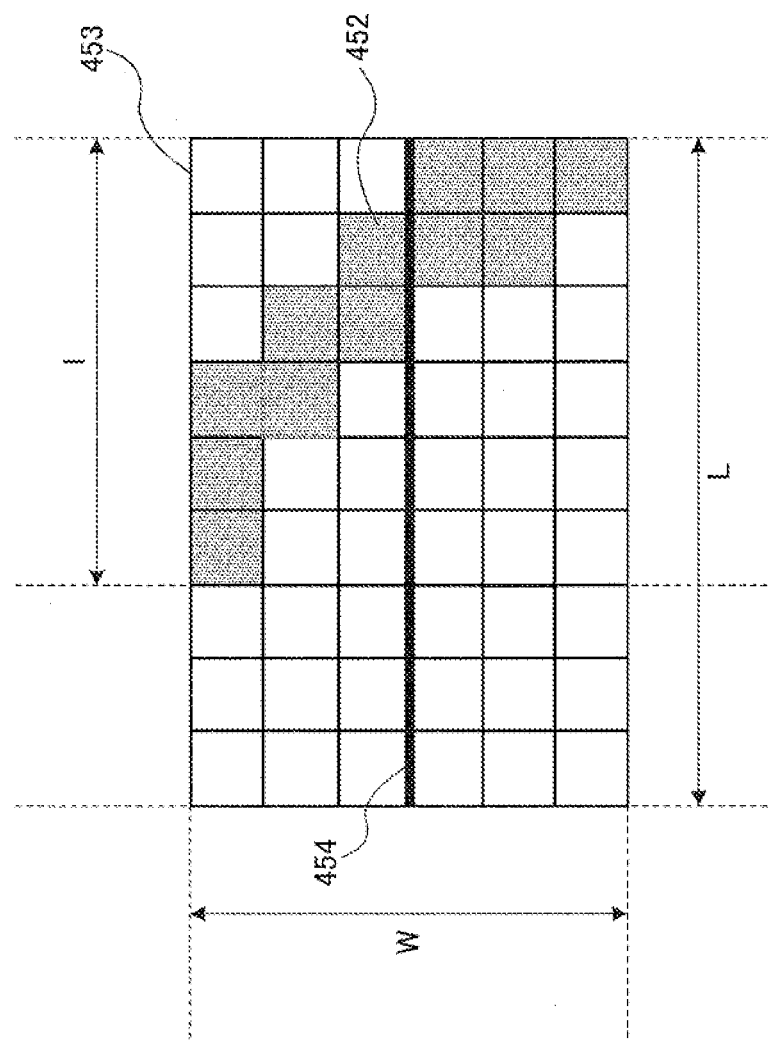
FIG. 14 is a diagram for describing the length of an edge according to Embodiment 2.

FIG. 14 is a diagram for describing the length of an edge, which corresponds to FIG. 13. Portions that correspond to FIG. 13 are denoted by the same reference numerals. However, the skeleton and edge illustrated in FIG. 14 are simplified compared to FIG. 13.

As shown in FIG. 14, it is assumed that pixels of edge 452 are included in one section of part rectangle 453. Parallel line extraction section 122 retrieves a portion at which, within part rectangle 453, pixels of edge 452 are continuous in a direction along center line 454 of part rectangle 453. The length of the edge is taken as the length of the portion at which the pixels of edge 452 are continuous in the direction along center line 454 of part rectangle 453.

In this case, as shown in FIG. 14, it is assumed that part rectangle 453 extends in the lateral direction. It is assumed that a pixel of edge 452 is not included in a pixel group from the first column to the third column from the left side of part rectangle 453, and pixels of edge 452 exist in succession in the fourth column to the ninth column from the left side of part rectangle 453. In this case, parallel line extraction section 122 takes a length l in the lateral direction of the fourth column to the ninth column (that is, a length corresponding to pixels in six columns) from the left side of part rectangle 453 as the length of the edge.

Subsequently, in step S1350 in FIG. 12, parallel line extraction section 122 calculates a length of a parallel line component based on the length of one or a plurality of edges calculated based on the pair of part rectangles.

More specifically, for example, in a case where lengths of a plurality of edges are calculated in a single part rectangle, parallel line extraction section 122 takes a total value of the lengths as the length of the edge for the relevant part rectangle. Further, parallel line extraction section 122 takes a length that is the shorter among the lengths of edges that are respectively extracted from the two part rectangles for one part to be the length of a parallel line component of the relevant part.

For example, in the example illustrated in FIG. 13, length $l_1$ of an edge obtained from part rectangle 453 on the upper side is shorter than length $l_2$ of an edge obtained from part rectangle 453 on the lower side. In this case, parallel line extraction section 122 takes length $l_1$ of the edge obtained from part rectangle 453 on the upper side as the length of the parallel line component of the part.

Note that parallel line extraction section 122 may calculate the length of a parallel line component using another method, such as a method that takes an average value of the respective lengths of the edges extracted from the two part rectangles as the length of the parallel line component of the part.

Next, in step S1360 in FIG. 12, parallel line extraction section 122 determines whether or not an unprocessed part remains among the parts included in the posture information.

If an unprocessed part remains (S1360: Yes), parallel line extraction section 122 returns to step S1320. In contrast, if no unprocessed part remains (S1360: No), parallel line extraction section 122 returns to the processing in FIG. 11.

In step S1400 in FIG. 11, for each part, estimation difficulty level determination section 123 determines an estimation difficulty level based on the length of the parallel line component and a predetermined threshold that is set in advance.

More specifically, among two or more estimation difficulty levels, estimation difficulty level determination section 123 holds a lower limit value of a length of a parallel line component in advance for each estimation difficulty level excluding the lowest estimation difficulty level. Subsequently, estimation difficulty level determination section 123 takes the lowest estimation difficulty level among the estimation difficulty levels for which a parallel line component length is equal to or greater than a lower limit value thereof as the estimation difficulty level of the currently selected part.

By using a threshold in this way, regardless of the original length of a part when the part is not covered, the estimation difficulty level can be determined by means of the length of the pixels of parallel lines that can be extracted from the image.

Note that the threshold may be different for each posture or for each part. Estimation difficulty level determination section 123 can perform a more detailed determination of the estimation difficulty level by subdividing the setting of the threshold.

Next, in step S1500, estimation difficulty level determination section 123 outputs the determined result to difficulty level information table 130 as difficulty level information.

Thereafter, in step S1600, posture information acquisition section 121 determines whether or not an unprocessed posture remains among the postures for which posture information is held in posture information database 110.

If an unprocessed posture remains (S1600: Yes), posture information acquisition section 121 returns to step S1100. If no unprocessed posture remains (S1600: No), posture information acquisition section 121 ends the estimation difficulty level determination processing and returns to the processing in FIG. 10.

As a result of the above described estimation difficulty level determination processing, posture estimation apparatus 100 enters a state in which difficulty level information that shows an estimation difficulty level of each part for each posture is prepared.

<Detailed Description of Posture Estimation Processing>

Next, details of the posture estimation processing are described.

Figure 15:
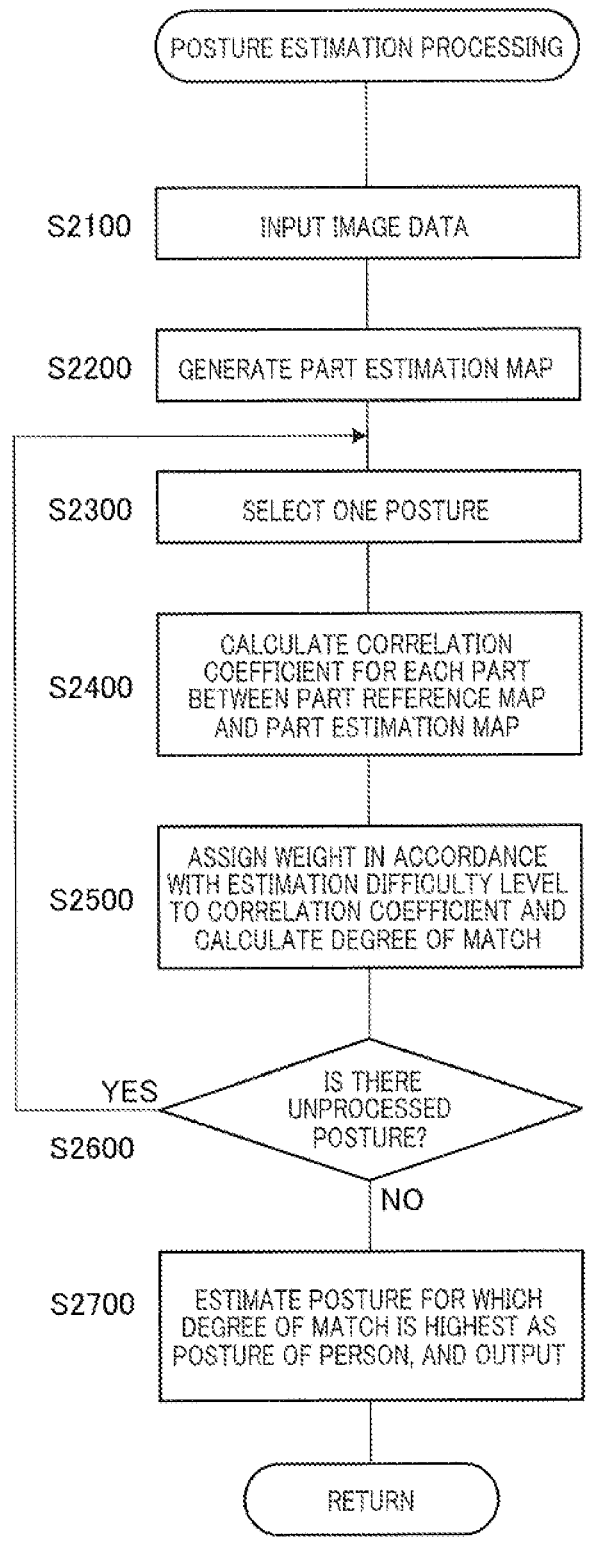
FIG. 15 is a flowchart illustrating an example of posture estimation processing according to Embodiment 2.

FIG. 15 is a flowchart that illustrates an example of posture estimation processing (S2000 in FIG. 10).

First, in step S2100, image input section 140 inputs image data for an image that is a target for posture estimation.

Next, in step S2200, for each part posture, part estimation section 150 generates a part estimation map based on image information for two-dimensional postures in posture information database 110.

An example of the processing to generate a part estimation map will now be described in detail. For example, it is assumed that a pixel position on an image is taken as (i, j), a likelihood value of a part k is denoted as ck, and the number of parts that exist in the part estimation map is n. In this case, the data structure of the part estimation map that part estimation section 150 outputs is such that likelihood vector Cij= [c1, c2, . . . , ck, . . . , cn].

A first example of a method for generating a part estimation map is a method that uses a classifier for each part.

Available methods for generating a classifier include a method that uses a Haar-like feature value as an image feature value, and performs learning from an image of a standard model using an algorithm called "Adaboost".

A Haar-like feature value is a feature value that is calculated on the basis of a pattern of a previously defined rectangular region, and is a known technique (see NPL 1). Adaboost is a method that generates a strong classifier by combining a plurality of classifiers whose identification capability is not very high, and is also a known technique (see NPL 2).

Part estimation section 150 generates a part estimation map by estimating a position of each part on an image using a classifier that was prepared in advance for each part by learning.

More specifically, part estimation section 150, for example, inputs an image feature value for a certain pixel into a strong classifier Hk of a part k, and calculates a sum total of values obtained by multiplying the respective outputs of each weak classifier constituting the strong classifier Hk by a reliability α that is previously obtained for each of the weak classifiers. Part estimation section 150 then subtracts a predetermined threshold Th from the calculated sum total to calculate a likelihood value ck of the part k of the pixel of interest. Part estimation section 150 performs this processing for each part and each pixel, and outputs a part estimation map.

A second example of a method for generating a part estimation map is a method in which, after the first method is used to estimate the position of a part that serves as a standard, such as the head, parallel lines are extracted from edges of an image for the remaining parts.

More specifically, for example, part estimation section 150 extracts parallel lines by referring to a pre-stored correspondence table in which the length of a head region, a value r of a standard thickness of each part, and a distance d from each part to the head region are associated. Based on the estimated head part, part estimation section 150 searches for a set of parallel lines that are separated by a distance corresponding to the standard thickness r for the relevant part within a region at a distance d from the head region of the part of interest while rotating the direction for determination by 360°. Part estimation section 150 repeats a process whereby, if there is a corresponding set of parallel lines, a vote is cast for each pixel in the region enclosed by those parallel lines, and generates a part estimation map based on the final number of votes for each pixel.

According to this method, the part estimation map includes the direction of parallel lines and the number of votes for each pixel and for each part.

For example, assuming that parallel lines angles are divided into eight categories, the likelihood values for each pixel and each part would assume an eight-dimensional value corresponding to those eight directions. In addition, for example, further assuming that the parallel line widths are classified into two widths, the likelihood values for each pixel and each part would assume a sixteen-dimensional (2×8=16) value.

Note that the parallel line distance or angle to be voted on may vary for each part. Part estimation section 150 can determine a likelihood by determining a plurality of parallel line widths and adjusting differences in physique and clothing and the like by using the likelihood value of the width with the highest likelihood value among the determined plurality of widths.

Next, in step S2300, fitting section 160 selects one posture for which posture information (a part reference map) is held in posture information database 110.

In step S2400, fitting section 160 calculates a correlation coefficient for each part between a part reference map of the currently selected posture and a part estimation map generated based on the image.

It is sufficient that the correlation coefficient is a value that shows the degree of correlation with a likelihood, and various known techniques can be applied to calculate the correlation coefficient. An example of a method for calculating the correlation coefficient will now be described.

With respect to the likelihood, it is assumed that, for example, in the part estimation map, a pixel position on an image is expressed as (i, j), a likelihood value for part k is denoted by ck, and the number of parts that exist in the part estimation map is p. In this case, it is assumed that a part estimation map that part estimation section 150 outputs is represented by a data structure such that likelihood vector Cij=[c1, c2, . . . , ck, . . . , cp].

In this case it is assumed that, with respect to part k, a data sequence of a likelihood map of the part in an input image is XKij=[ck], and a data sequence of a part estimation map within posture information database 110 is YKij=[ck]. Further, it is assumed that a data sequence (x, y)={(XKij, YKij) (1<=i<=n, 1<=j<=m)} that is formed of two sets of numerical values is provided.

In this case, fitting section 160, for example, determines a correlation coefficient Sk of part k using the following equation 1. Note that, in equation 1, x with a mean symbol (bar) represents the arithmetic mean value of x, and y with a mean symbol (bar) represents the arithmetic mean value of y.

[1]

$$Sk = \frac{\sum_{i=1,j=1}^{n,m} (x_{ij} - \overline{x})(y_{ij} - \overline{y})}{\sqrt{\sum_{i=1,j=1}^{n,m} (x_{ij} - \overline{x})^2} \sqrt{\sum_{i=1,j=1}^{n,m} (y_{ij} - \overline{y})^2}} \quad \text{(Equation 1)}$$

Fitting section 160 pairs a correlation coefficient for each part to which a part identifier is added and a two-dimensional posture identifier of a two-dimensional posture in posture information database 110 that is used in the calculation, and outputs the resulting pair to posture estimation section 170.

Next, in step S2500, posture estimation section 170 calculates a degree of match between the part reference map of the currently selected posture and the part estimation map that was generated based on the image. At such time, posture estimation section 170 acquires difficulty level information for the currently selected posture from difficulty level information table 130, and calculates the aforementioned degree of match by assigning a weight that is in accordance with the estimation difficulty level to the correlation coefficient.

An example of a method for calculating a degree of match to which a weight is assigned in accordance with the estimation difficulty level will now be described.

Based on the correlation coefficients for each part that are acquired from fitting section 160, posture estimation section 170 estimates a posture that is most similar to the posture of a person included in the image from among the two-dimensional postures in posture information database 110.

For example, posture estimation section 170 first excludes two-dimensional postures that include a part for which a correlation coefficient is less than or equal to a predetermined threshold from the candidates. That is, in step S2500, posture estimation section 170 does not perform processing to calculate the degree of match for the aforementioned postures.

Next, with respect to the two-dimensional postures that remain as candidates, posture estimation section 170 calculates a degree of match V using a correlation coefficient Sk of each part k and the estimation difficulty level of each part that is acquired from difficulty level information table 130. More specifically, posture estimation section 170, for example, calculates a degree of match Vp for a two-dimensional posture identifier p using the following equation 2. Here, Dk represents a weighting that is applied to the part k of the two-dimensional posture that is currently selected. In this case, the higher that the estimation difficulty level is, the lower the value that Dk takes, and for example, Dk is a reciprocal number of the estimation difficulty level.

[2]

$$Vp = \sum_{k=1}^{p} DkSk \quad \text{(Equation 2)}$$

The degree of match Vp is a value that reduces the influence of a part at which the accuracy of the correlation coefficient is low.

Next, in step S2600, fitting section 160 determines whether or not an unprocessed posture remains among the postures for which posture information (a part reference map) is held in posture information database 110.

If an unprocessed posture remains (S2600: Yes), fitting section 160 returns to step S2300. On the other hand, if there is no remaining unprocessed posture (S2600: No), posture information acquisition section 121 advances to step 2700.

In step S2700, posture estimation section 170 estimates that a posture for which the degree of match V is highest among the postures for which posture information (a part reference map) is held in posture information database 110 is the posture of the person included in the image. Posture estimation apparatus 100 outputs the estimation result from estimation result output section 180, ends the posture estimation processing, and returns to the processing in FIG. 10.

As a result of the above described posture estimation processing, posture estimation apparatus 100 can perform a highly accurate posture estimation that takes into consideration the estimation difficulty level of each part for each posture.

Note that posture estimation apparatus 100 may also be configured to generate a part reference map by performing a similar procedure as the procedure used to generate the above described part estimation map with respect to an object image of each posture.

This ends the description of the operations of posture estimation apparatus 100.

<Effects of Posture Estimation Apparatus>

As described above, posture estimation apparatus 100 according to the present embodiment can determine an estimation difficulty level of each part based on a parallel line component, and perform a posture estimation that takes into account the estimation difficulty level of each part. Accordingly, posture estimation apparatus 100 can estimate the posture of an object that is formed of a plurality of parts with high accuracy.

<Other Configurations of Posture Estimation Apparatus>

Note that, according to the present embodiment, the estimation difficulty level determination processing and the posture estimation processing may also be executed by physically separate apparatuses.

Figure 16:
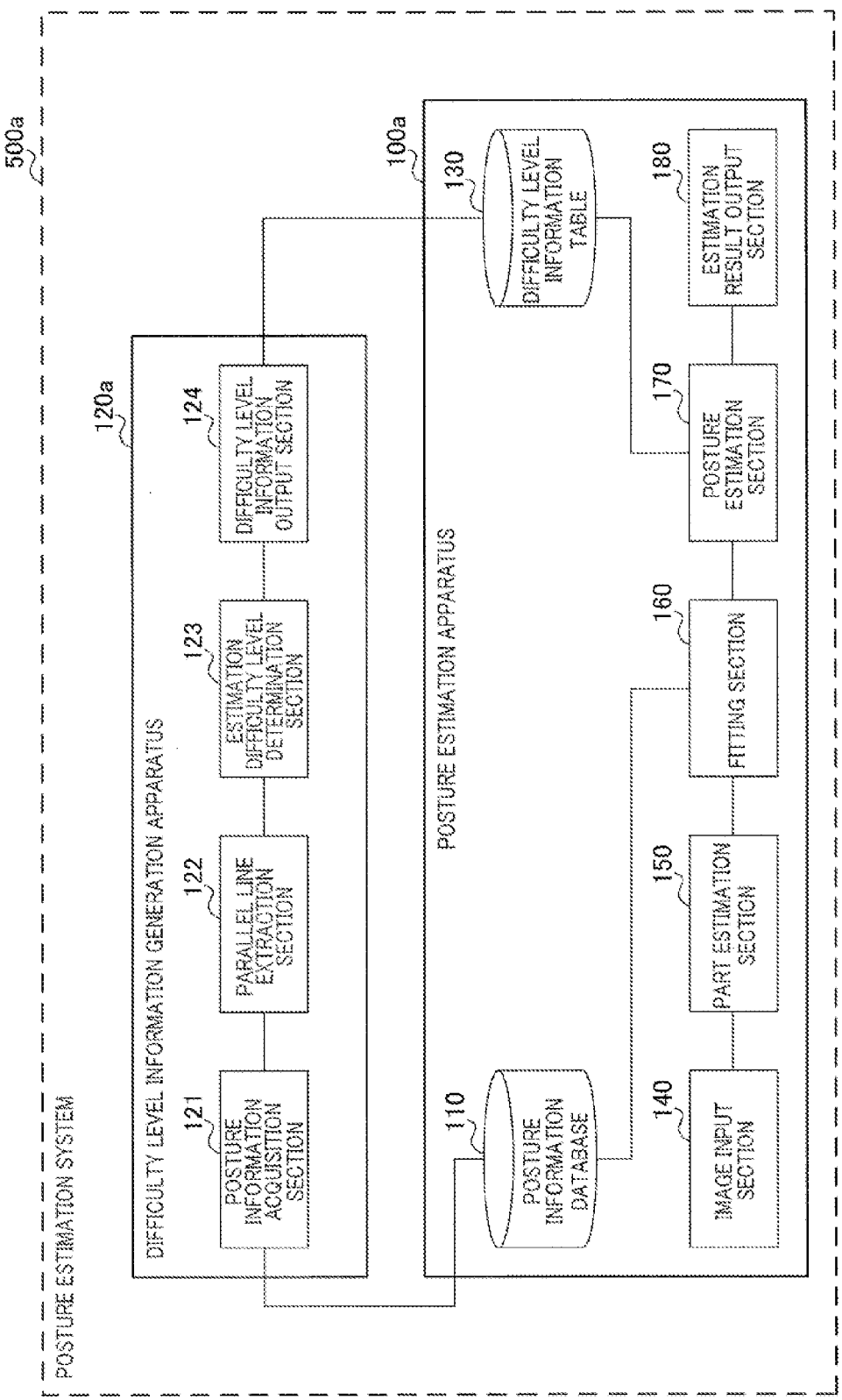
FIG. 16 is a block diagram illustrating an example of another configuration of the posture estimation apparatus according to Embodiment 2.

FIG. 16 is a block diagram illustrating another configuration of posture estimation apparatus 100.

As shown in FIG. 16, posture estimation apparatus 100a constitutes posture estimation system 500a together with, for example, difficulty level information generation apparatus 120a.

Posture estimation apparatus 100a has the same configuration as posture estimation apparatus 100 shown in FIG. 2, except that difficulty level information generation section 120 in the configuration shown in FIG. 2 has been extracted therefrom.

Difficulty level information generation apparatus 120a includes the same sections as difficulty level information generation section 120 shown in FIG. 2. However, posture estimation apparatus 100a and difficulty level information generation apparatus 120a each include a communication circuit or the like, and send and receive posture information and difficulty level information by wire communication or wireless communication.

Adopting this configuration makes posture estimation apparatus 100a lighter and smaller.

Difficulty level information generation section 120 (or difficulty level information generation apparatus 120a) may also be configured so as to determine on the basis of the posture information, for each posture, the likelihood of confusion between each part and another part, and to determine the estimation difficulty level as a higher value for the part with a higher likelihood of confusion.

Figure 17:
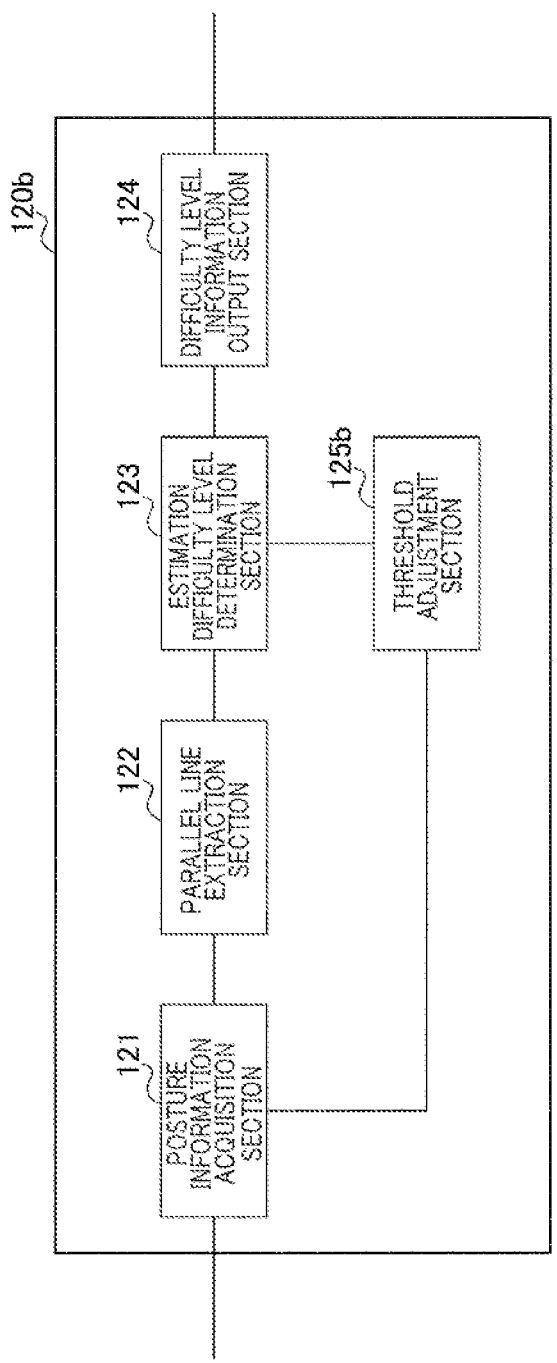
FIG. 17 is a block diagram illustrating a first example of another configuration of a difficulty level information generation section according to Embodiment 2.

FIG. 17 is a block diagram illustrating a first example of another configuration of the difficulty level information generation section.

As shown in FIG. 17, in addition to the configuration shown in FIG. 2, difficulty level information generation section 120b further includes threshold adjustment section 125b.

Threshold adjustment section 125b assumes that the larger the average thickness of a part is, the higher the likelihood of confusion is. That is, threshold adjustment section 125b sets a threshold for a length of a parallel line component that estimation difficulty level determination section 123 applies to the relevant part to a higher value. Thus, threshold adjustment section 125b makes it easier for the estimation difficulty level to be determined as being a higher value.

This is because the greater that the average thickness of a part is, the higher that the possibility becomes that an edge of another part is mixed within the region of the relevant part.

Figure 18:
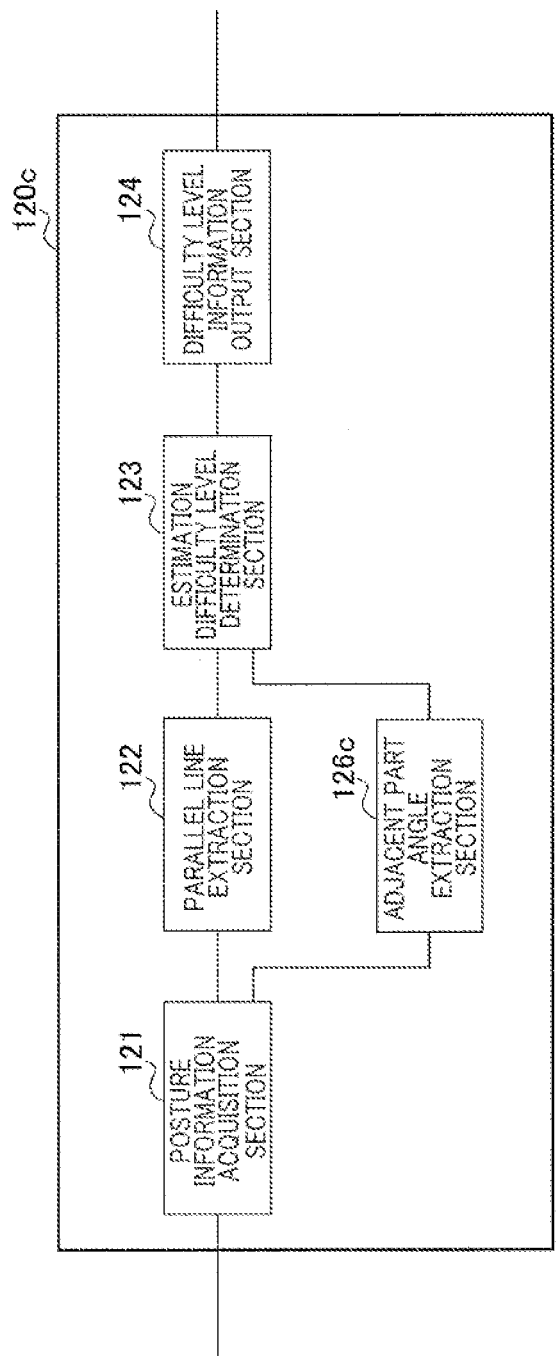
FIG. 18 is a block diagram illustrating a second example of another configuration of the difficulty level information generation section according to Embodiment 2.

FIG. 18 is a block diagram illustrating a second example of another configuration of the difficulty level information generation section.

As shown in FIG. 18, in addition to the configuration shown in FIG. 2, difficulty level information generation section 120c also includes adjacent part angle extraction section 126c. In this case, it is assumed that posture information that posture information acquisition section 121 acquires also includes part angle information.

Based on the part angle information and a skeleton image, for each of the parts, adjacent part angle extraction section 126c sets an area of a predetermined distance from a skeleton of the relevant part as a part area. For each of the parts, adjacent part angle extraction section 126c extracts an angle of another part that is included in the part area thereof from the part angle information. Adjacent part angle extraction section 126c assumes that the closer the angle of the relevant part and an angle of a skeleton of another part that is included in the part area of the relevant part are to each other, the higher the likelihood of confusion is with the other part. That is, adjacent part angle extraction section 126c sets a threshold of a length of a parallel line component that estimation difficulty level determination section 123 applies to the relevant part to a higher value. Thus, adjacent part angle extraction section 126c makes it easier for the estimation difficulty level to be determined as being a higher value.

This is because if a plurality of parts whose angles are near to each other are in the vicinity of each other, it becomes difficult to distinguish the edges of the respective parts.

Thus, since difficulty level information generation sections 120b and 120c are configured to make it easier for the estimation difficulty level to be determined as a higher value as the likelihood of confusion with another part is higher at each of the parts, the estimation difficulty level can be determined with higher accuracy.

Note that, a method for making it easier to determine the estimation difficulty level as a higher value is not limited to adjustment of the threshold. For example, difficulty level information generation sections 120b and 120c may also be configured to directly determine the estimation difficulty level based on the likelihood of confusion.

Although, according to the present embodiment, skeleton images and edge images are held as image information of posture information database 110 in posture estimation apparatus 100, the present invention is not limited thereto. Posture estimation apparatus 100 may also be configured so that skeleton images are not held in posture information database 110, and are instead generated in succession based on joint position information at difficulty level information generation section 120. Further, posture estimation apparatus 100 may also be configured so that the aforementioned superimposed images in which a skeleton image and an edge image are superimposed on each other are held in advance in posture information database 110.

Embodiment 3

Embodiment 3 of the present invention represents an example of a configuration in which posture estimation is performed using a previous estimation result in the case of inputting images that are in time sequence, such as a video.

<Configuration of Posture Estimation Apparatus>

Figure 19:
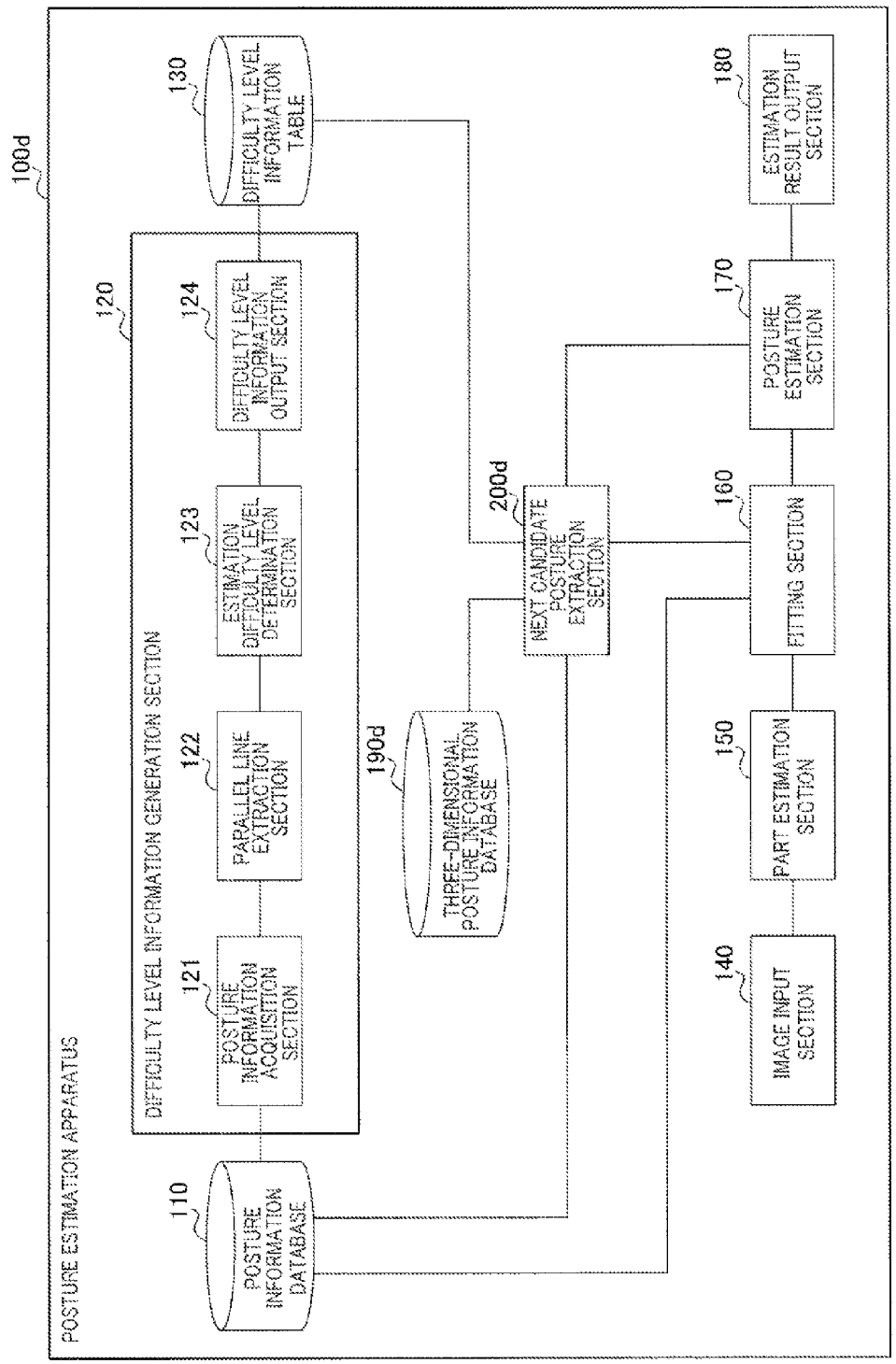
FIG. 19 is a block diagram illustrating an example of the configuration of a posture estimation apparatus according to Embodiment 3 of the present invention.

FIG. 19 is a block diagram illustrating an example of the configuration of a posture estimation apparatus according to the present embodiment, and corresponds to FIG. 2 of Embodiment 1 Components that are the same as in FIG. 2 are denoted by the same reference characters and a description of such components is omitted hereunder.

In FIG. 19, in addition to the configuration shown in FIG. 2, posture estimation apparatus 100d also includes three-dimensional posture information database 190d and next candidate posture extraction section 200d.

For each three-dimensional posture, three-dimensional posture information database 190d holds a two-dimensional posture identifier of a corresponding two-dimensional posture (see FIG. 9). Further, for each posture, three-dimensional posture information database 190d holds three-dimensional joint position information and transitionable three-dimensional posture information, or information indicating the aforementioned items of information.

The three-dimensional joint position information is information that shows a position in three-dimensional space of each joint in a three-dimensional skeletal posture (hereunder, referred to as "three-dimensional posture"). The transitionable three-dimensional posture information is information that shows a three-dimensional posture that can be transitioned to after a unit time elapses. That is, the transitionable three-dimensional posture information that is associated with a three-dimensional posture shows a human motion model. The three-dimensional space is a space that is based on a position and orientation of an imaging surface of a camera (not illustrated in the accompanying drawings) that photographs a person, and is defined, for example, by an xyz coordinate system.

A three-dimensional joint position information identifier and a transitionable three-dimensional posture identifier are assigned to the three-dimensional joint position information and the transitionable three-dimensional posture information, respectively.

By using the three-dimensional posture information table in which these identifiers are associated with the respective three-dimensional postures, three-dimensional posture information database 190d associates the three-dimensional postures with the three-dimensional joint position information and the transitionable three-dimensional posture information.

FIG. 20 illustrates an example of a three-dimensional posture information table.

As shown in FIG. 20, three-dimensional posture information table 610 includes, for example, two-dimensional posture identifiers 612, three-dimensional joint position information identifiers 613, and transitionable three-dimensional posture identifiers 614 described in association with three-dimensional posture identifiers 611.

Note that a configuration may also be adopted in which, in three-dimensional posture information table 610, the above described identifiers are not used, and information is described that is directly associated with each of the three-dimensional postures.

In three-dimensional posture information database 190d, the transitionable three-dimensional posture information may be described for a plurality of postures having different levels of similarity.

When there are a small number of next candidate postures (postures indicated by the transitionable three-dimensional posture information) that correspond to one three-dimensional posture, the processing load of fitting section 160 at a subsequent stage is reduced and the speed of the posture estimation processing increases.

On the other hand, when there are a large number of next candidate postures (postures indicated by the transitionable three-dimensional posture information) that correspond to one three-dimensional posture, the possibility of the correct posture being omitted from the next candidate postures decreases, and therefore the posture estimation processing is robust.

The range of motion and speed of movement differs for each joint of a human model. Accordingly, previously holding transitionable three-dimensional postures in this manner allows posture estimation apparatus 100*d* to swiftly estimate the next candidate posture.

Note that, in three-dimensional posture information table 610, transitionable three-dimensional posture identifiers may also be associated with a plurality of different units of time, respectively. In such case, it is possible to quickly and accurately estimate appropriate next candidate postures in accordance with the timings of image inputs (intervals between posture estimations).

Next candidate posture extraction section 200*d* illustrated in FIG. 19 estimates next candidate postures based on a posture that is estimated the previous time (hereunder, referred to as "previous estimation posture") and the transitionable three-dimensional posture information (that is, a motion model) of three-dimensional posture information database 190*d*. Next candidate posture extraction section 200*d* outputs information (for example, a two-dimensional posture identifier) showing the estimated next candidate postures to fitting section 160.

In the present embodiment, fitting section 160 performs fitting with respect to the part estimation map by narrowing down the fitting to the part reference maps of the next candidate postures inputted from next candidate posture extraction section 200*d*.

However, in a case where the estimation regarding the previous estimation posture was originally erroneous, there is a high possibility that next candidate posture extraction section 200*d* will estimate wrong postures as the next candidate postures.

Therefore, in a case where the reliability of the previous estimation posture is low, next candidate posture extraction section 200*d* estimates the next candidate postures using information obtained from the image that is the object of estimation, and not from the motion model. Further, next candidate posture extraction section 200*d* determines whether or not the reliability of the previous estimation posture is low based on whether or not there is a part for which the estimation difficulty level is higher than the predetermined threshold.

Consequently, based on the condition that a part does not exist for which the estimation difficulty level is higher than the predetermined threshold, fitting section 160 performs fitting of a likelihood map by narrowing down the fitting to the next candidate postures that are estimated based on the three-dimensional posture information. Further, based on the condition that a part does not exist for which the estimation difficulty level is higher than the predetermined threshold, posture estimation section 170 performs a determination with respect to the posture of a person by narrowing down the determination to the next candidate postures that are estimated on the basis of the three-dimensional posture information.

Further, posture estimation section 170 outputs a two-dimensional posture identifier for the estimated posture to next candidate posture extraction section 200*d* for use in processing of the next image.

<Operations of Posture Estimation Apparatus>

Figure 21:
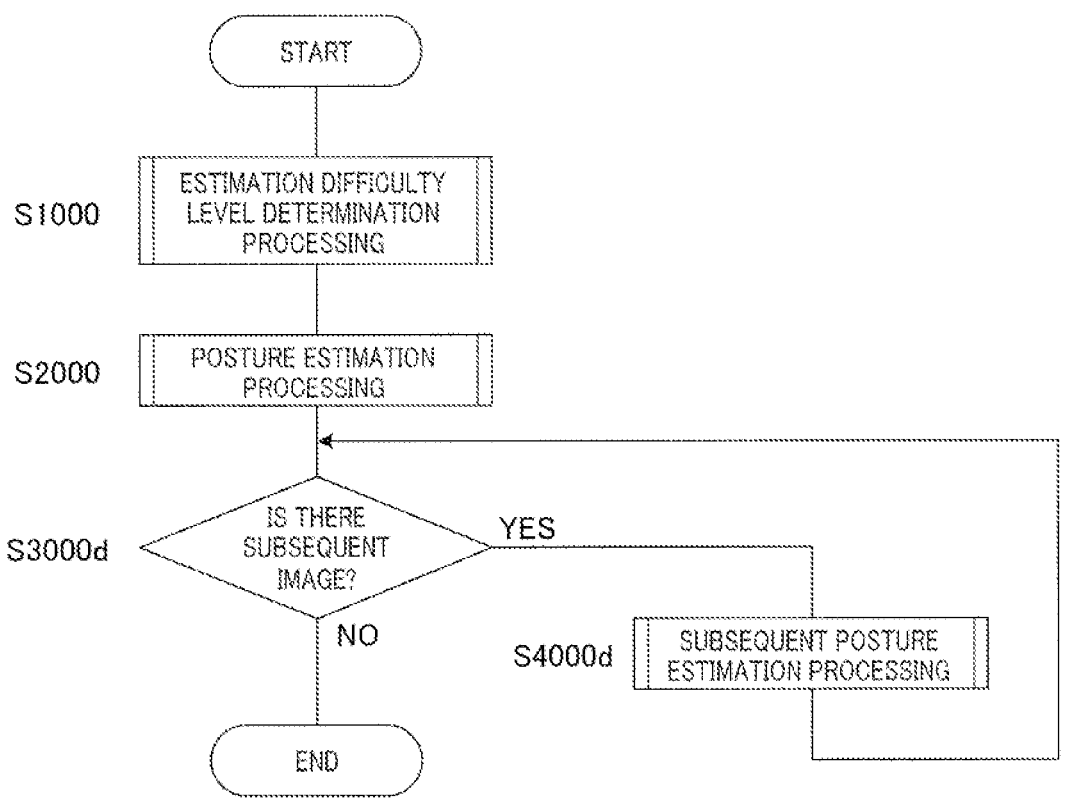
FIG. 21 is a flowchart illustrating an example of operations of the posture estimation apparatus according to Embodiment 3.

FIG. 21 is a flowchart illustrating an example of operations of posture estimation apparatus 100*d* that corresponds to FIG. 10 of Embodiment 2. Steps that are the same as in FIG. 10 are denoted by the same reference characters and a description of such steps is omitted hereunder.

In the present embodiment, after performing posture estimation processing (S2000), posture estimation apparatus 100*d* advances to step S3000*d*.

In step S3000*d*, posture estimation apparatus 100*d* determines whether or not there is a subsequent image. In this case, the term "subsequent image" refers to a next still image after the still image that is last processed among a plurality of still images in time series that constitute a video.

If there is no subsequent image (S3000*d*: No), posture estimation apparatus 100*d* ends the series of processing. On the other hand, if there is a subsequent image (S3000*d*: Yes), posture estimation apparatus 100*d* advances to step S4000*d*.

In step S4000*d*, posture estimation apparatus 100*d* performs subsequent posture estimation processing. The subsequent posture estimation processing is processing that performs a posture estimation utilizing the previous estimation posture.

<Subsequent Posture Estimation Processing>

Figure 22:
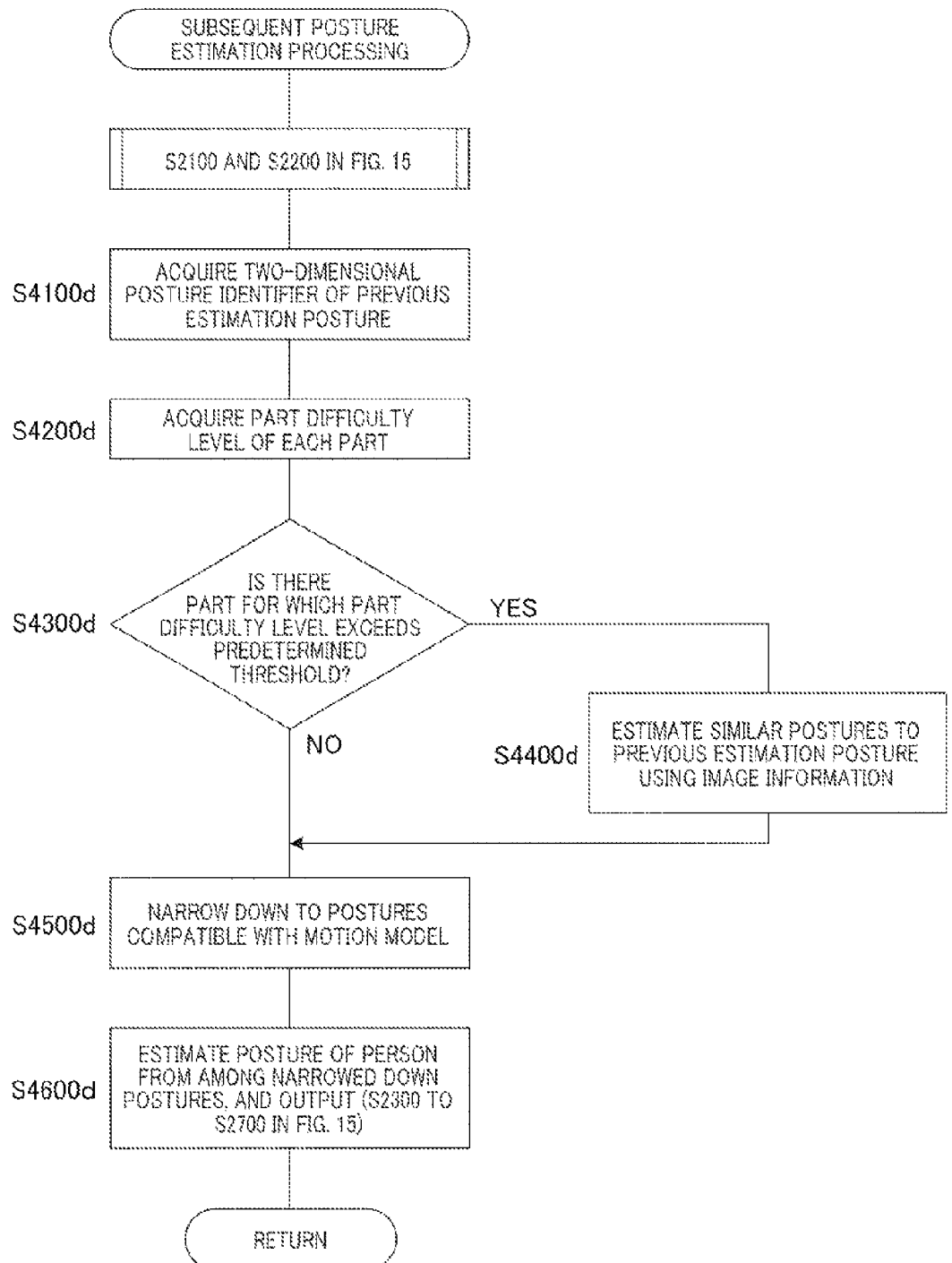
FIG. 22 is a flowchart illustrating an example of subsequent posture estimation processing according to Embodiment 3.

FIG. 22 is a flowchart illustrating an example of the subsequent posture estimation processing (S4000*d* in FIG. 21) of the present embodiment.

One portion of the subsequent posture estimation processing is the same as the posture estimation processing described in FIG. 15 of Embodiment 2. The portion that is the same as the processing in FIG. 15 is denoted by the same reference characters, and a description thereof is omitted hereunder.

After a part estimation map is generated at part estimation section 150 (S2200), in step S4100*d*, next candidate posture extraction section 200*d* acquires a two-dimensional posture identifier of the previous estimation posture from posture estimation section 170.

Next, in step S4200*d*, next candidate posture extraction section 200*d* acquires a part difficulty level of each part in the posture indicated by the acquired two-dimensional posture identifier from difficulty level information table 130.

Thereafter, in step S4300*d*, next candidate posture extraction section 200*d* determines whether or not a part for which the part difficulty level exceeds a predetermined threshold exists among the parts of the previous estimation posture.

If there is a part for which the part difficulty level exceeds the predetermined threshold (S4300*d*: Yes), next candidate posture extraction section 200*d* advances to step S4400*d*. On the other hand, if there is a part for which the part difficulty level exceeds the predetermined threshold does not (S4300*d*: No), next candidate posture extraction section 200*d* skips step S4400*d* and advances to step S4500*d* that is described later.

In step S4400*d*, next candidate posture extraction section 200*d* estimates similar postures to the previous estimation posture based on information for the image of the previous estimation posture, and outputs the similar postures to the previous estimation posture together with the previous estimation posture for use in step S4500*d*.

Thus, when an outputted two-dimensional posture includes a part having a high possibility that the posture is not correct because estimation is difficult, and when the posture of the image to be input next deviates from a normal motion model, posture estimation section 170 uses a degree of similarity of the image information to increase the number of candidates. Thus, it is possible for posture estimation section 170 to prevent a correct posture being omitted from the candidates.

Various methods can be used as a method for narrowing down the similarity of the previous estimation posture based on the information of the image.

For example, a method may be adopted in which next candidate posture extraction section 200*d* acquires data of a silhouette image of each posture from posture information database 110, and superimposes a silhouette image extracted from the image on the acquired silhouette image of each posture. Subsequently, next candidate posture extraction section 200d determines the number of pixels of the regions in which the silhouettes overlap, and extracts a posture for which the value is greater than a predetermined threshold as a similar posture to the previous estimation posture. At such time, next candidate posture extraction section 200d may be configured so as to determine the number of pixels of regions in which the silhouettes overlap, in a manner which limits the determination to movable regions of parts for which the part difficulty level is high.

Note that, this kind of method for narrowing down similar postures to the previous estimation posture can also be used when generating transitionable three-dimensional posture information (a motion model).

In step S4500d, based on the previous estimation posture and the similar postures to the previous estimation posture, next candidate posture extraction section 200d narrows down the next candidate postures to postures that are compatible with the motion model. That is, next candidate posture extraction section 200d narrows down the next candidate postures based on the transitionable three-dimensional posture information of three-dimensional posture information database 190d.

Subsequently, in step S4600d, posture estimation section 170 estimates the posture of the person from among the next candidate postures that remain after the next candidate postures are narrowed down in step S4500d. Estimation result output section 180 outputs the estimation result. The processing in step S4600d may also be the same, for example, as the processing in steps S2300 to S2700 in FIG. 15.

If it is found as a result of the foregoing processing that the part estimation difficulty level is low and there is a low possibility of an error in the estimated two-dimensional posture, next posture candidates can be extracted using only the motion model. In a case where the part estimation difficulty level is high and a part with respect to which there is a high possibility of an error is included in the estimated two-dimensional posture, the candidates can be increased using image information, and thereafter next posture candidates can be extracted using the motion model. That is, it is possible for posture estimation apparatus 100d to perform a robust posture estimation.

<How Postures Are Narrowed Down>

Hereunder, the manner in which postures to serve as targets for fitting are narrowed down by posture estimation apparatus 100d is described. The description in this case focuses on only the movement of the right arm among a series of movements in which a person picks up an article from a shelf.

Figure 23A:
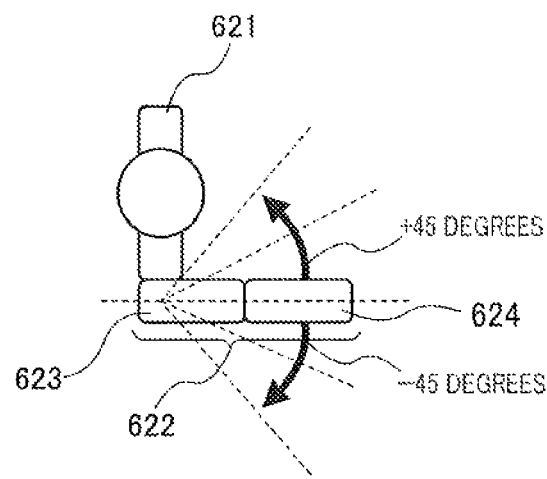
FIGS. 23A to 23C illustrate an example of an operating range of a right arm according to Embodiment 3.
Figure 23B:
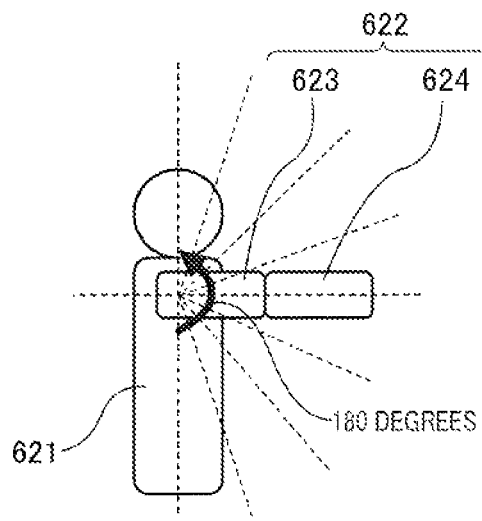
Figure 23C:
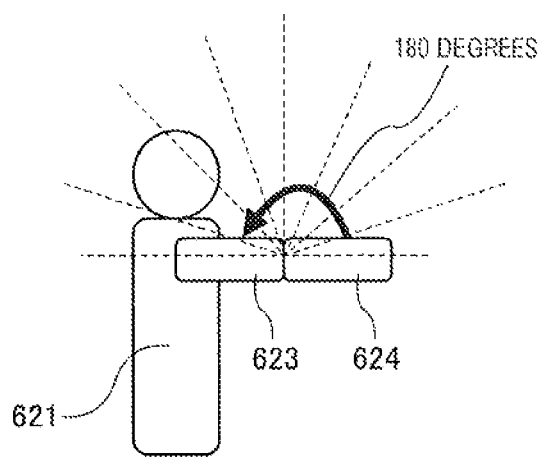

FIGS. 23A to 23C illustrate an example of the operating range of the right arm. FIG. 23A illustrates the operating range on a horizontal plane of the right arm with respect to the torso. FIG. 23B illustrates the operating range on a vertical plane of the right upper arm with respect to the torso. FIG. 23C illustrates the operating range on a vertical plane of the right forearm with respect to the right upper arm.

As shown in FIG. 23A, the operating range on a horizontal plane of right arm 622 (right upper arm 623 and right forearm 624) with respect to torso 621 is a range of −45° to +45° with respect to the front direction of torso 621.

Further, as shown in FIG. 23B, the operating range on a vertical plane of right upper arm 623 with respect to torso 621 is a range of 0° to 180° with respect to the vertical direction.

In addition, as shown in FIG. 23C, the operating range on a vertical plane of right forearm 624 with respect to right upper arm 623 is a range of 0° to 180° with respect to the axial direction of right upper arm 623.

It is assumed that an angle of right arm 622 (right upper arm 623 and right forearm 624) in the above described operating range can be estimated in increments of 22.5°.

Figure 24:
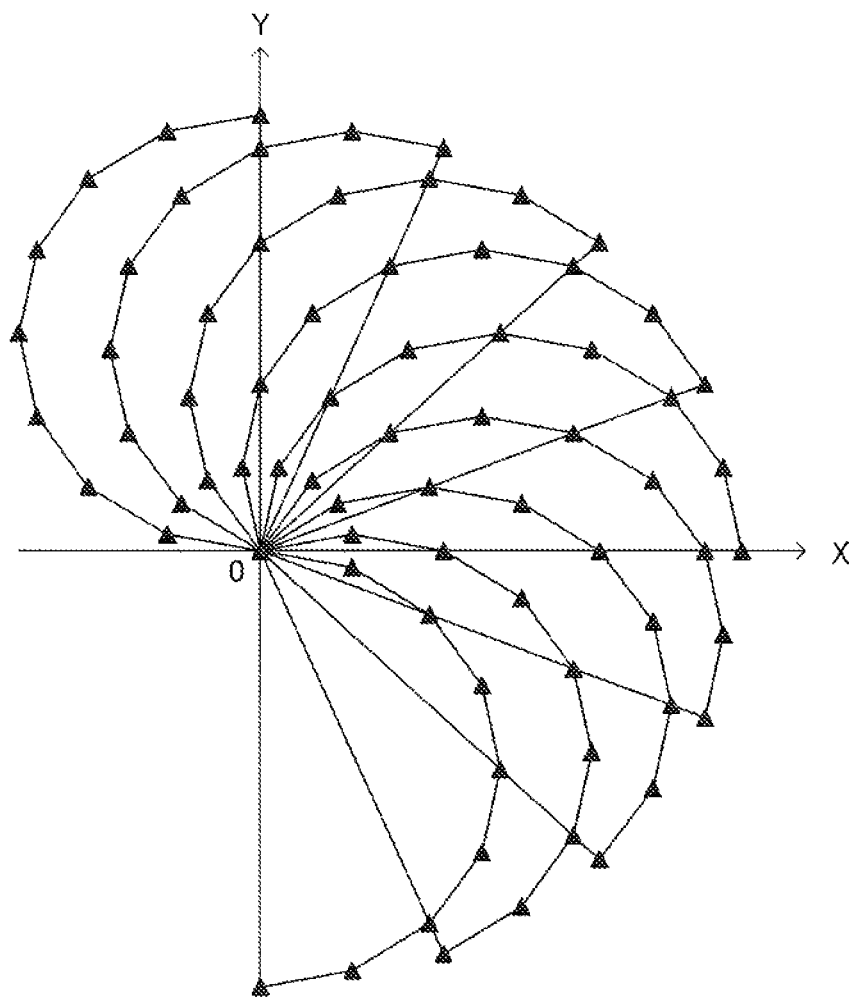
FIG. 24 illustrates positions that a tip portion of a right forearm can take according to Embodiment 3.

FIG. 24 illustrates positions (trajectories) that a tip portion of the right forearm can take in a posture in which the right arm faces in the front direction of the torso. In FIG. 24, the X axis represents a distance in the front direction of the torso when the right shoulder is taken as the origin, and the Y axis represents a distance in the vertical direction when the right shoulder is taken as the origin. In each of the drawings described hereunder, a triangular mark (Δ) indicates a position the tip portion of the right forearm can take.

As shown in FIG. 24, the tip portion of the right forearm can take 9×9=81 different positions.

Note that, the number of operating ranges existing on the horizontal plane of right arm 622 is five, and the tip portion of the right forearm can take 9×9=81 positions in each direction. Accordingly, a person can assume 5×81=405 postures.

Note that, a case in which the elevation angle of the camera is 0° and a person is photographed directly from the side is a special case. That is, the patterns of positions that a tip portion of the right forearm can take on an image are identical in cases where the orientation on the horizontal plane of right arm 622 is −45° and +45° and in cases where the orientation on the horizontal plane of right arm 622 is −22.5° and +22.5°. Further, patterns for a posture in which the arm is lowered straight down and a posture in which the arm is raised straight up are identical. Accordingly, in a case where a camera photographs a person directly from the side at an elevation angle of 0°, the number of postures that it is possible to check on the image is 3×81−4=243−4=239.

Thus, by using a motion model, posture estimation apparatus 100d can easily narrow down the next candidate postures from a large number of postures. For example, let us assume that photographing and posture estimation are performed every 0.1 seconds, and angles of each joint of a person can change only up to 22.5° per 0.1 seconds in each of the horizontal direction and vertical direction. In such a case, the number of next candidate postures is narrowed down to 3×3=9 postures or less.

However, narrowing down of next candidate postures by means of a motion model is not effective in a case where the previous estimation posture is an incorrect posture whose silhouette is identical to that of the correct posture.

Figure 25:
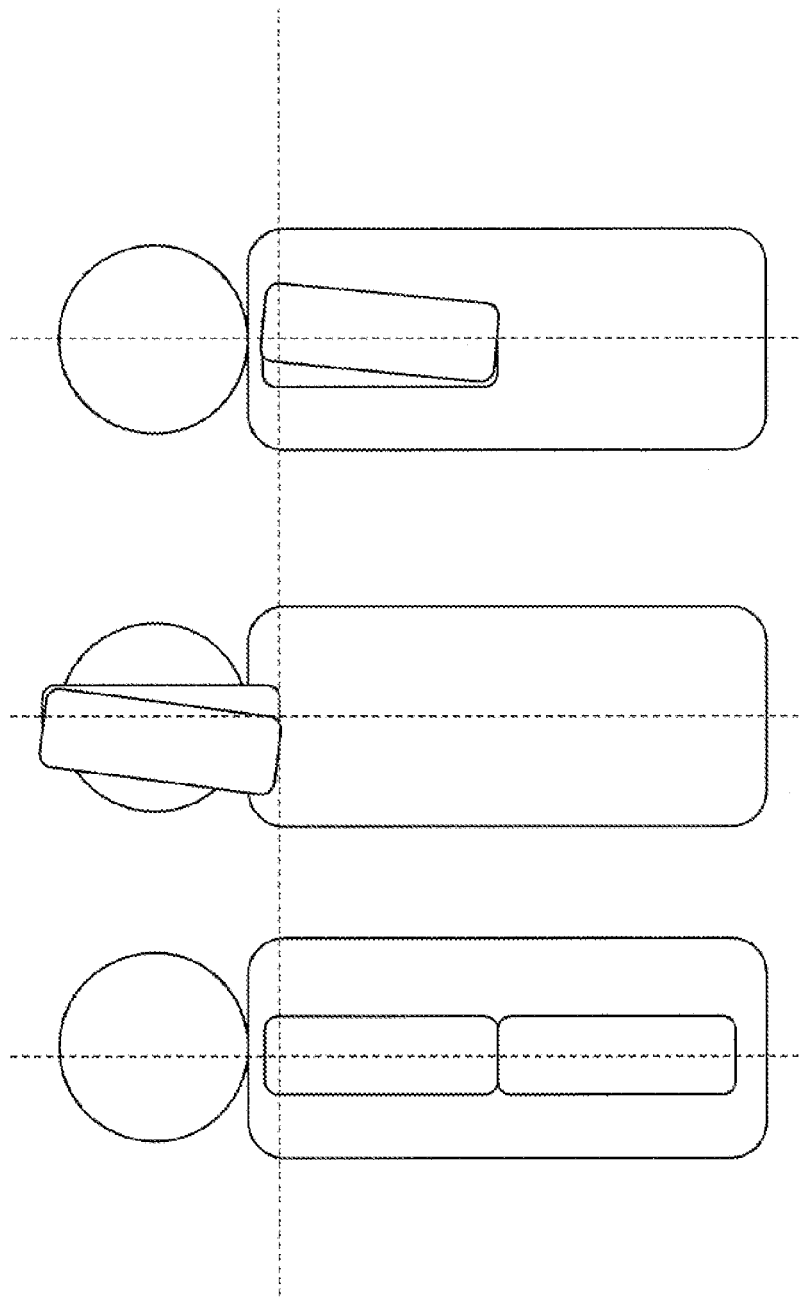
FIGS. 25A to 25C illustrate an example of a plurality of postures whose silhouettes are identical according to Embodiment 3.

FIGS. 25A to 25C illustrate an example of a plurality of postures whose silhouettes are identical.

As shown in FIG. 25A, it is assumed that the previous estimation posture is a posture in which the arm extends straight down. However, in the cases illustrated in FIG. 25B and FIG. 25C, other postures also exist that have an identical silhouette to the posture illustrated in FIG. 25A, and there is a possibility that the posture illustrated in FIG. 25A may be mistakenly estimated to be these postures.

Figure 26:
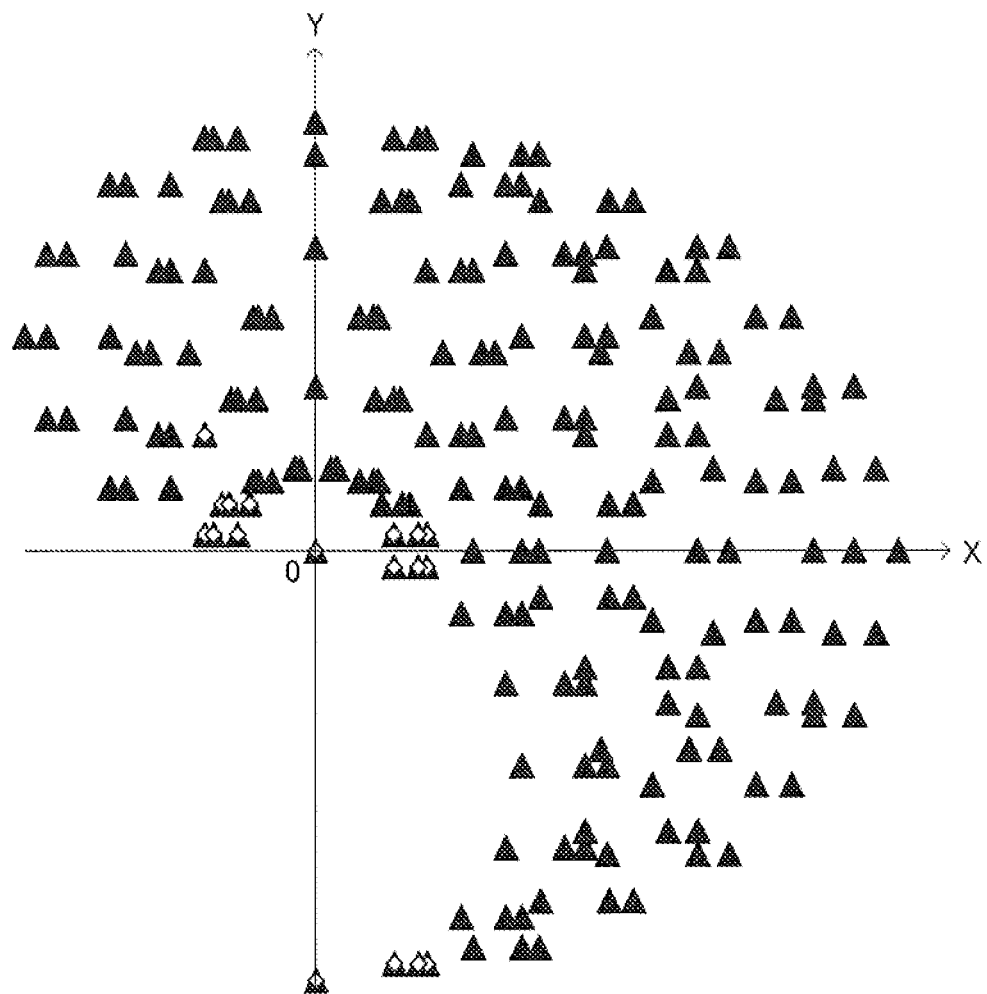
FIG. 26 illustrates positions that a tip portion of a right forearm can take in a case where narrowing down of next candidate postures by means of a motion model is not performed according to Embodiment 3.

FIG. 26 illustrates positions (trajectories) that a tip portion of the right forearm can take in a case where the estimation difficulty level for the right upper arm and the right forearm is high, that is, a case where narrowing down of next candidate postures by means of a motion model is not performed. In each of the drawings describe below, a diamond-shaped mark (◇) indicates a position that the tip portion of the right forearm can take in a next candidate posture.

The number of postures having the same silhouette (postures in which the right arm overlaps with the torso and head) as the posture illustrated in FIG. 25A is, for example, 41. In a case where a person is photographed directly from the side at an elevation angle of 0°, the number of postures having the same silhouette as the posture illustrated in FIG. 25A is, for example, 18.

Figure 27:
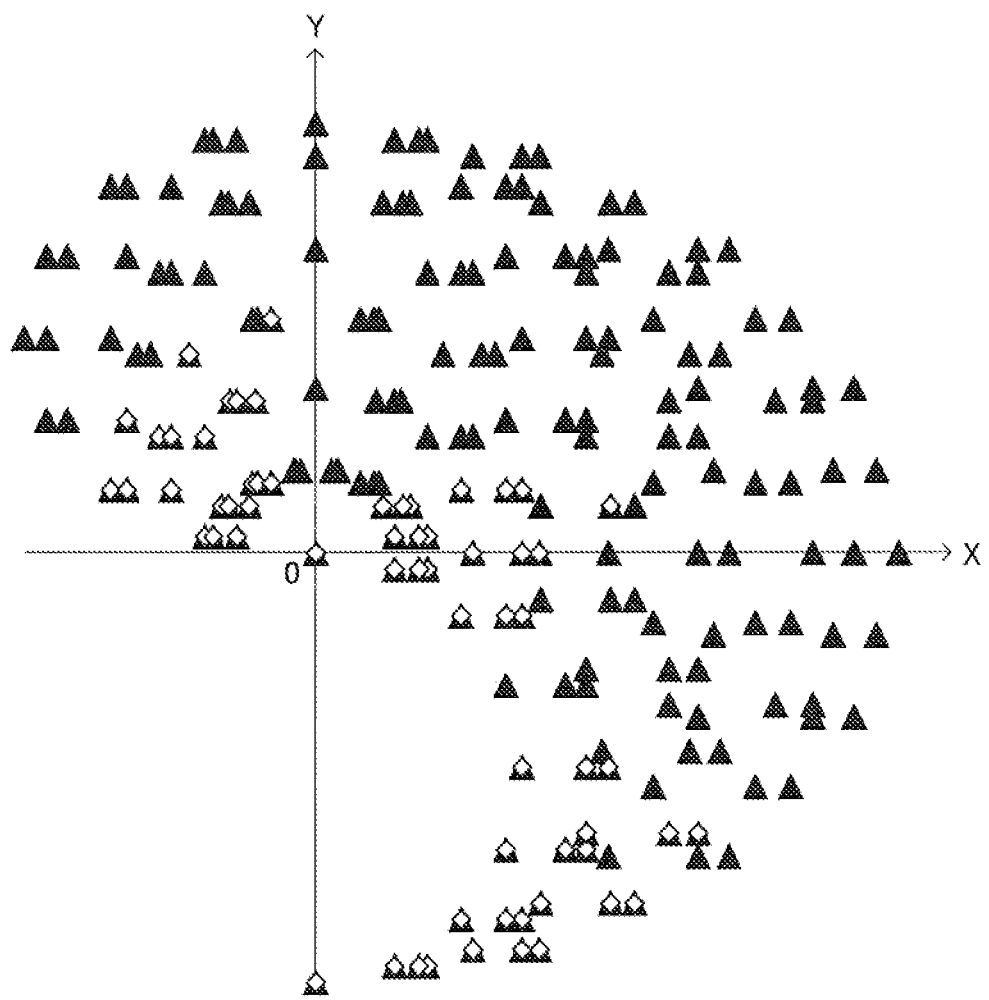
FIG. 27 illustrates positions that a tip portion of a right forearm can take in a case where narrowing down of next candidate postures by means of a motion model is performed according to Embodiment 3.

FIG. 27 illustrates positions (trajectories) that a tip portion of the right forearm can take in a case where the estimation difficulty level for the right upper arm and the right forearm is low, that is, a case where narrowing down of next candidate postures by means of a motion model is performed.

The number of transitionable three-dimensional postures with respect to the posture illustrated in FIG. 25A is, for example, 91. In a case where a person is photographed directly from the side at an elevation angle of 0°, the number of two-dimensional postures of the transitionable three-dimensional postures with respect to the posture illustrated in FIG. 25A is, for example, 63.

As described above, if a part for which the estimation difficulty level is high does not exist, posture estimation apparatus 100d can reduce the number of next candidate postures from 243 to 63 in a case where a person is photographed directly from the side at an elevation angle of 0°, and from 405 to 91 in other cases. Further, even if there is a part for which the estimation difficulty level is high, in a case where a person is photographed directly from the side at an elevation angle of 0°, posture estimation apparatus 100d can reduce the number of next candidate postures from 243 to 18 based on the degree of similarity of silhouette images.

<Effects of Posture Estimation Apparatus>

As described above, posture estimation apparatus 100d according to the present embodiment determines the reliability of the previous estimation posture based on the estimation difficulty level, and if the reliability of the previous estimation posture is high, extracts next posture candidates using a motion model. As a result, posture estimation apparatus 100d can speed up processing and lower the processing load.

Further, if the reliability of the previous estimation posture is low, posture estimation apparatus 100d according to the present embodiment performs a posture determination based on image information. Alternatively, if the reliability of the previous estimation posture is low, posture estimation apparatus 100d according to the present embodiment increases the range of candidates for the previous estimation posture using the degree of similarity of image information, and thereafter extracts the next posture candidates using a motion model. Thus, posture estimation apparatus 100d can perform a robust posture estimation.

Note that although the case in which the object of posture estimation is a person has been described in Embodiments 2 and 3, the present invention can also be applied to posture estimation for various kinds of objects that are formed of a plurality of parts, such as a robot.

A posture estimation apparatus according to this disclosure is an apparatus for estimating a posture of an object formed of a plurality of parts, the apparatus including: an image input section that acquires an image that is obtained by photographing the object; a posture information database that holds posture information that defines an arrangement of the plurality of parts for each of the postures; a fitting section that, for each of the parts, calculates a degree of correlation between an arrangement of the plurality of parts in the image and the posture information; a difficulty level information table that holds an estimation difficulty level which is a degree of difficulty of estimating respective position of each of the parts for each of the postures and which is calculated based on respective parallel line components of the part that are included in the posture information; and a posture estimation section that assigns a weight based on the estimation difficulty level to the degree of correlation, and that estimates a posture of the object based on the weighted degree of correlation.

The posture estimation apparatus described above may further include: a parallel line extraction section that, for each of the postures, extracts a parallel line component of each of the parts from the posture information; and an estimation difficulty level determination section that determines the estimation difficulty level for each of the postures based on the extracted parallel line components, and that causes the difficulty level information table to hold a determination result.

In the posture estimation apparatus, the estimation difficulty level determination section may determine a lower value of the estimation difficulty level for the part where a greater number of parallel line components are extracted.

In the posture estimation apparatus, the estimation difficulty level determination section may determine a lower value of the estimation difficulty level for the part where a longer parallel line component is extracted.

In the posture estimation apparatus: the posture information may include an outline of each of the parts when a three-dimensional model of the object is projected onto a two-dimensional plane; and the parallel line extraction section may extract the parallel line component from the outline.

In the posture estimation apparatus: the posture information may include a position of an axis, a length of the axis, and an average thickness of each of the parts when a three-dimensional model of the object is projected onto a two-dimensional plane; and the parallel line extraction section may dispose a pair of part rectangles as a search range of the outline on both sides of the axis based on the position of the axis, the length of the axis, and the average thickness, and extract a component in a direction of the axis of a portion included in the pair of part rectangles of the outline as the parallel line component.

In the posture estimation apparatus, the estimation difficulty level determination section may determine, for each of the postures, a likelihood of confusion with another part for each of the parts based on the posture information, and determine a higher value of the estimation difficulty level for the part where the likelihood of confusion with another part is higher.

The posture estimation apparatus described above may further include a part estimation section that generates, based on the image that is received, a part estimation map indicating a distribution of likelihood of each of the plurality of parts being positioned in the image, in which: the fitting section may compare a part reference map that indicates a distribution of likelihood of each of the plurality of parts being positioned on the two-dimensional plane with the part estimation map, and calculate, for each of the postures and each of the parts, a degree of correlation for each part between an arrangement of the plurality of parts in the image obtained by photographing the object and the posture information; and the posture estimation section, for each of the postures, assigns a weight to a degree of correlation for each part between the arrangement of the plurality of parts in the image obtained by photographing the object and the posture information in a manner such that the weight becomes small as the estimation difficulty level becomes large, calculates a degree of match between the part reference map and the part estimation map, and determines the posture that corresponds to the part estimation map for which the calculated degree of match is highest, as being a posture of the object.

The posture estimation apparatus described above may further include a next candidate posture extraction section that, for each of the postures, estimates next candidate postures that are the postures that the object can take next, based on three-dimensional posture information that defines the postures which are transitionable after a unit time elapses, and a previous estimation posture that is a posture estimated to be a posture of the object at a previous time, in which the posture estimation section determines a posture of the object by narrowing down the next candidate postures that are estimated based on the three-dimensional posture information, on a condition that the part for which the estimation difficulty level is higher than a predetermined threshold does not exist.

A posture estimation method according to this disclosure is a method for estimating a posture of an object formed of a plurality of parts, the method including: acquiring an image that is obtained by photographing the object; calculating a degree of correlation for each of the parts between an arrangement of the plurality of parts in the image and posture information that defines an arrangement of the plurality of parts for each of the postures; assigning to the degree of correlation a weight based on an estimation difficulty level which is a degree of difficulty of estimating respective position of each of the parts for each of the postures and which is calculated based on respective parallel line components of the part that are included in the posture information; and estimating a posture of the object based on the weighted degree of correlation.

The disclosure of the specification, the drawings, and the abstract included in Japanese Patent Application No. 2011-273575 filed on Dec. 14, 2011, is incorporated herein by reference in its entirety.

INDUSTRIAL APPLICABILITY

The present invention is useful as a posture estimation apparatus and a posture estimation method that can estimate the posture of an object that is formed of a plurality of parts, with high accuracy.

REFERENCE SIGNS LIST 100, 100a, 100d Posture estimation apparatus
110 Posture information database
120, 120b, 120c Difficulty level information generation section
120a Difficulty level information generation apparatus
121 Posture information acquisition section
122 Parallel line extraction section
123 Estimation difficulty level determination section
124 Difficulty level information output section
125b Threshold adjustment section
126c Adjacent part angle extraction section
130 Difficulty level information table
140 Image input section
150 Part estimation section
160 Fitting section
170 Posture estimation section
180 Estimation result output section
190d Three-dimensional posture info illation database
200d Next candidate posture extraction section
500a Posture estimation system

The invention claimed is:

1. A posture estimation apparatus for estimating a posture of an object formed of a plurality of parts, the posture estimation apparatus comprising:
an image input section that acquires an image that is obtained by photographing the object;
a posture information database that holds posture information that defines an arrangement of the plurality of parts for each of the postures;
a fitting section that, for each of the parts, calculates a degree of correlation between an arrangement of the plurality of parts in the image and the posture information;
a difficulty level information table that holds an estimation difficulty level which is a degree of difficulty of estimating respective position of each of the parts for each of the postures and which is calculated based on respective parallel line components of the part that are included in the posture information; and
a posture estimation section that assigns a weight based on the estimation difficulty level to the degree of correlation, and that estimates a posture of the object based on the weighted degree of correlation.

2. The posture estimation apparatus according to claim 1, further comprising:
a parallel line extraction section that, for each of the postures, extracts a parallel line component of each of the parts from the posture information; and
an estimation difficulty level determination section that determines the estimation difficulty level for each of the postures based on the extracted parallel line components, and that causes the difficulty level information table to hold a determination result.

3. The posture estimation apparatus according to claim 2, wherein the estimation difficulty level determination section determines a lower value of the estimation difficulty level for the part where a greater number of parallel line components are extracted.

4. The posture estimation apparatus according to claim 2, wherein the estimation difficulty level determination section determines a lower value of the estimation difficulty level for the part where a longer parallel line component is extracted.

5. The posture estimation apparatus according to claim 2, wherein:
the posture information includes an outline of each of the parts when a three-dimensional model of the object is projected onto a two-dimensional plane; and
the parallel line extraction section extracts the parallel line component from the outline.

6. The posture estimation apparatus according to claim 5, wherein:
the posture information includes a position of an axis, a length of the axis, and an average thickness of each of the parts when a three-dimensional model of the object is projected onto a two-dimensional plane; and
the parallel line extraction section disposes a pair of part rectangles as a search range of the outline on both sides of the axis based on the position of the axis, the length of the axis, and the average thickness, and extracts a component in a direction of the axis of a portion included in the pair of part rectangles of the outline as the parallel line component.

7. The posture estimation apparatus according to claim 2, wherein the estimation difficulty level determination section determines, for each of the postures, a likelihood of confusion with another part for each of the parts based on the posture information, and determines a higher value of the estimation difficulty level for the part where the likelihood of confusion with another part is higher.

8. The posture estimation apparatus according to claim 1, further comprising
a part estimation section that generates, based on the image that is received, a part estimation map indicating a distribution of likelihood of each of the plurality of parts being positioned in the image, wherein:

the fitting section compares a part reference map that indicates a distribution of likelihood of each of the plurality of parts being positioned on the two-dimensional plane with the part estimation map, and calculates, for each of the postures and each of the parts, a degree of correlation for each part between an arrangement of the plurality of parts in the image obtained by photographing the object and the posture information; and the posture estimation section, for each of the postures, assigns a weight to a degree of correlation for each part between the arrangement of the plurality of parts in the image obtained by photographing the object and the posture information in a manner such that the weight becomes small as the estimation difficulty level becomes large, calculates a degree of match between the part reference map and the part estimation map, and determines the posture that corresponds to the part estimation map for which the calculated degree of match is highest, as being a posture of the object.

9. The posture estimation apparatus according to claim 1, further comprising a next candidate posture extraction section that, for each of the postures, estimates next candidate postures that are the postures that the object can take next, based on three-dimensional posture information that defines the postures which are transitionable after a unit time elapses, and a previous estimation posture that is a posture estimated to be a posture of the object at a previous time, wherein the posture estimation section determines a posture of the object by narrowing down the next candidate postures that are estimated based on the three-dimensional posture information, on a condition that the part for which the estimation difficulty level is higher than a predetermined threshold does not exist.

10. A posture estimation method for estimating a posture of an object formed of a plurality of parts, the posture estimation method comprising:

acquiring an image that is obtained by photographing the object;

calculating a degree of correlation for each of the parts between an arrangement of the plurality of parts in the image and posture information that defines an arrangement of the plurality of parts for each of the postures;

assigning to the degree of correlation a weight based on an estimation difficulty level which is a degree of difficulty of estimating respective position of each of the parts for each of the postures and which is calculated based on respective parallel line components of the part that are included in the posture information; and estimating a posture of the object based on the weighted degree of correlation.

* * * * *